(12) United States Patent
Enda

(10) Patent No.: US 8,165,852 B2
(45) Date of Patent: Apr. 24, 2012

(54) SIMULATION APPARATUS FOR A SEMICONDUCTOR DEVICE

(75) Inventor: Toshiyuki Enda, Zushi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 12/563,517

(22) Filed: Sep. 21, 2009

(65) Prior Publication Data

US 2010/0169061 A1 Jul. 1, 2010

(30) Foreign Application Priority Data

Dec. 26, 2008 (JP) ................................ 2008-334637

(51) Int. Cl.
*G06F 17/50* (2006.01)
(52) U.S. Cl. ................ 703/1; 703/13; 703/14; 716/109; 716/120; 716/127; 716/133
(58) Field of Classification Search ................ 703/1, 13, 703/14; 716/109, 120, 127, 133
See application file for complete search history.

(56) References Cited

U.S. PATENT DOCUMENTS

| | | | |
|---|---|---|---|
| 5,889,687 A | 3/1999 | Enda | |
| 6,195,790 B1 | 2/2001 | Tanimoto et al. | |
| 6,304,834 B1 | 10/2001 | Enda | |
| 6,784,006 B2 | 8/2004 | Tanimoto et al. | |

FOREIGN PATENT DOCUMENTS

JP    6-69493    3/1994

OTHER PUBLICATIONS

"Influence of mobility fluctuations on random telegraph signal amplitude in n-channel metal-oxide-semiconductor field-effect transistors" Godoy AIP Nov. 1997.*

* cited by examiner

*Primary Examiner* — Saif Alhija
(74) *Attorney, Agent, or Firm* — Oblon, Spivak, McClelland, Maier & Neustadt, L.L.P.

(57) ABSTRACT

A simulation apparatus of semiconductor device includes a first calculator, a second calculator, a third calculator, a fourth calculator, and a controller. The first calculator applies a voltage to an area which functions as a virtual electrode, and setting a pseudo-Fermi level of a first carrier in the area functioning as the virtual electrode to calculate a first carrier density. The second calculator analyzes continuous equation of a second carrier to calculate a second carrier density. The third calculator uses the first carrier density as a function of an electrostatic potential, and solving a first equation of the function and a Poisson's equation to calculate an electrostatic potential and the first carrier density expressed by the function. The fourth calculator calculates a current density of the first carrier to calculate a current flowing. The controller controls the voltage applied to the virtual electrode.

19 Claims, 11 Drawing Sheets

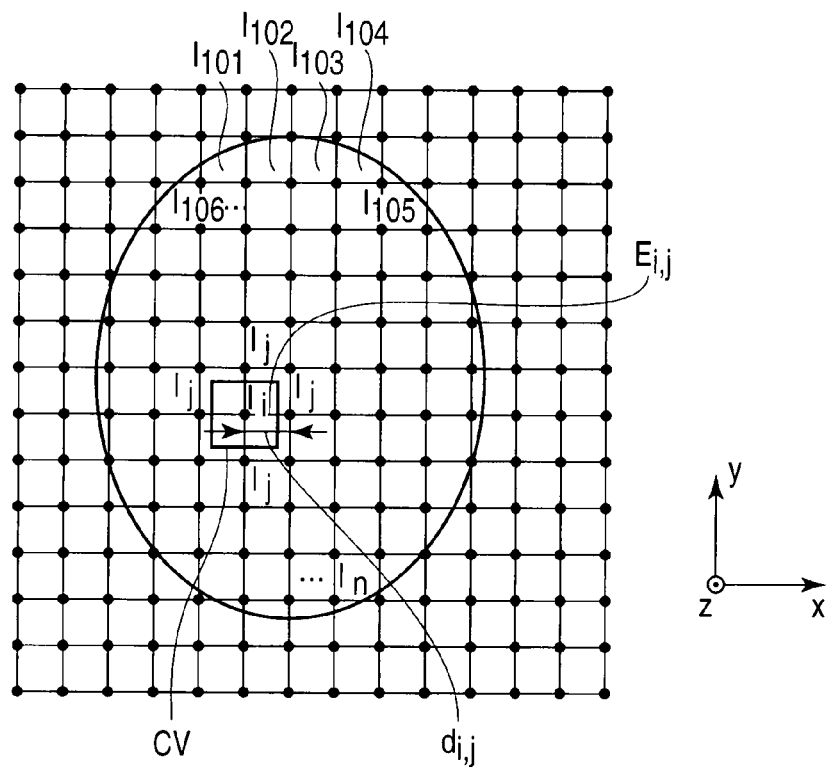
F I G. 4
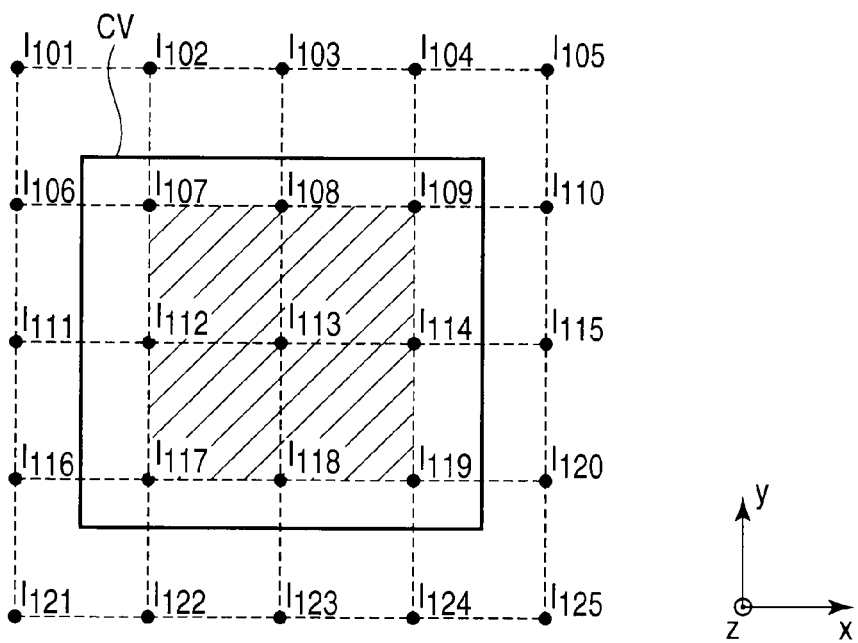
F I G. 6

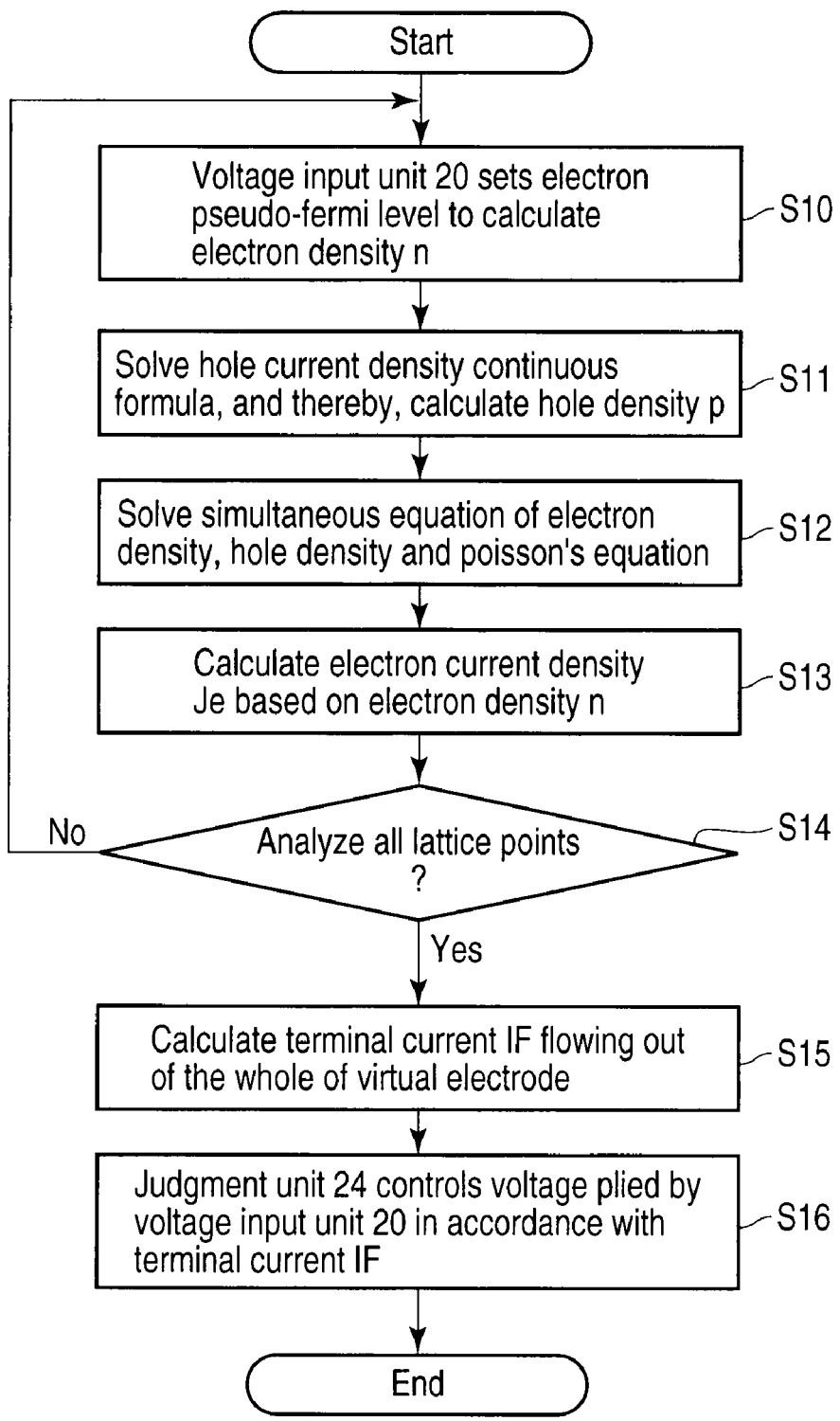
F I G. 5

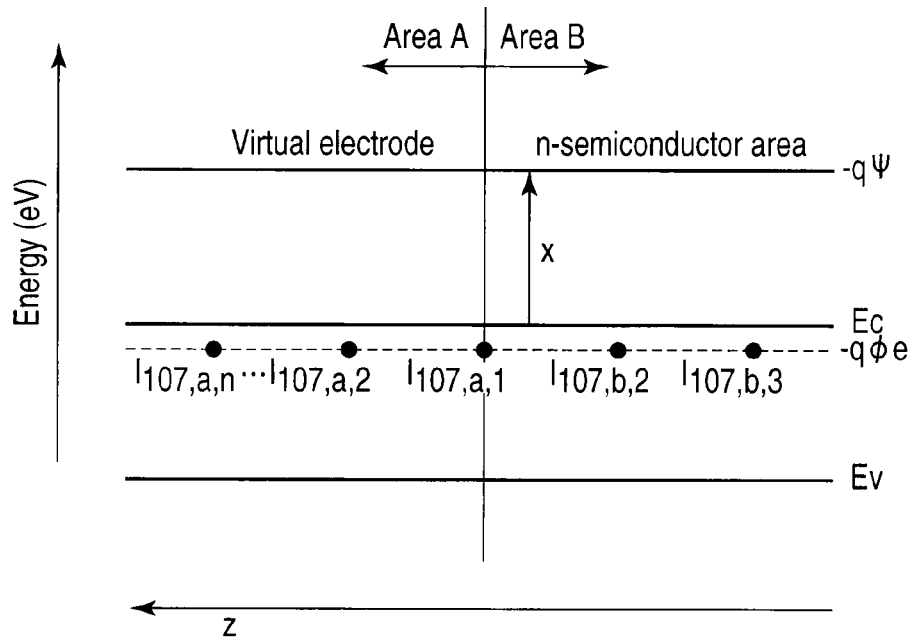
F I G. 7
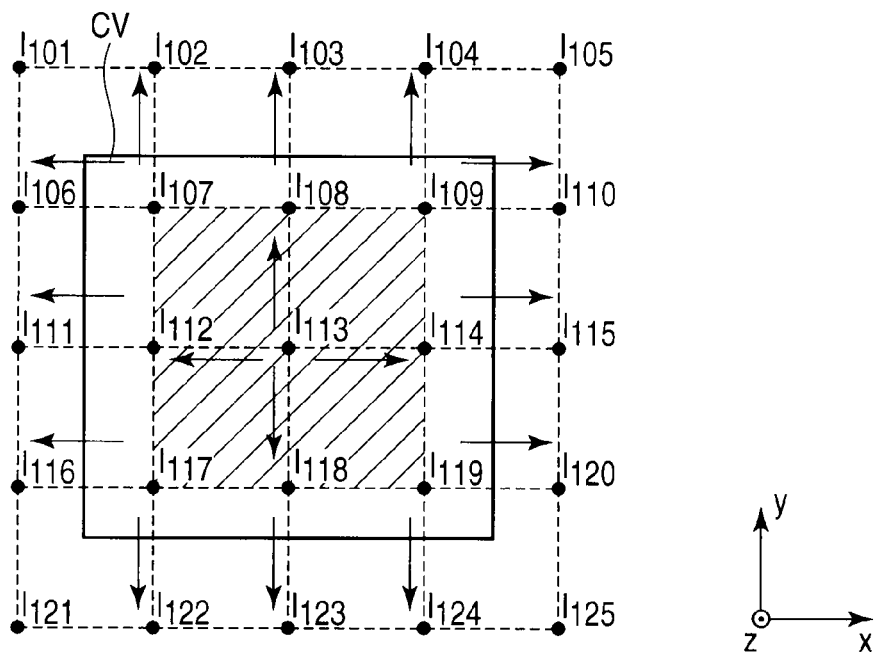
F I G. 8

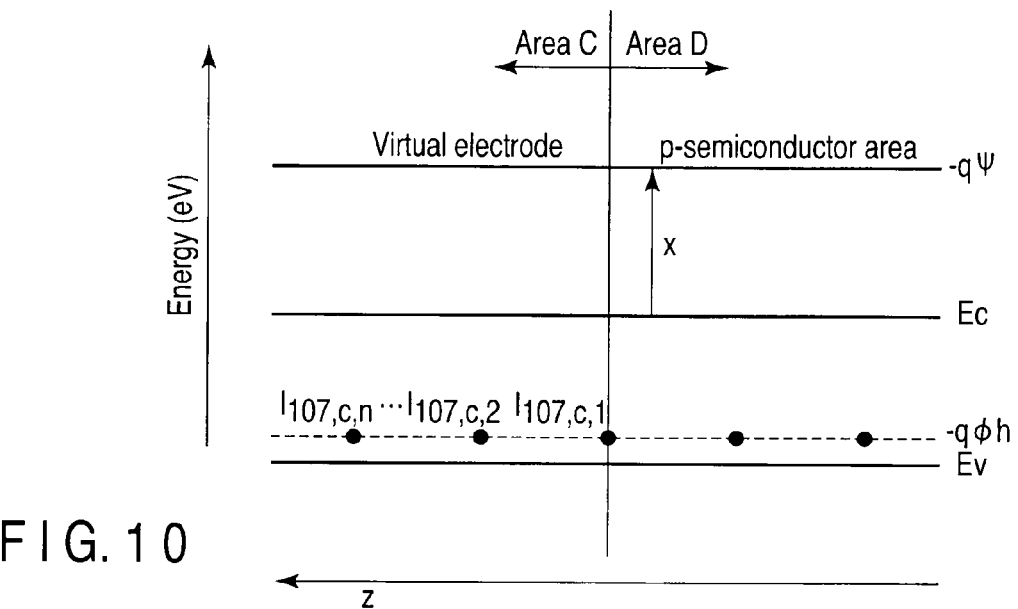
F I G. 10
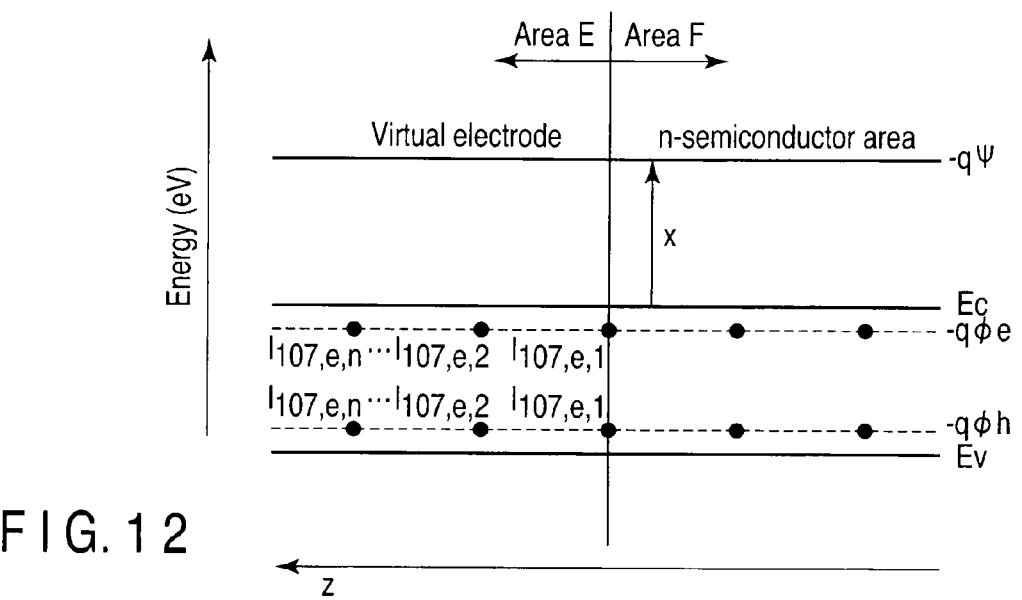
F I G. 12
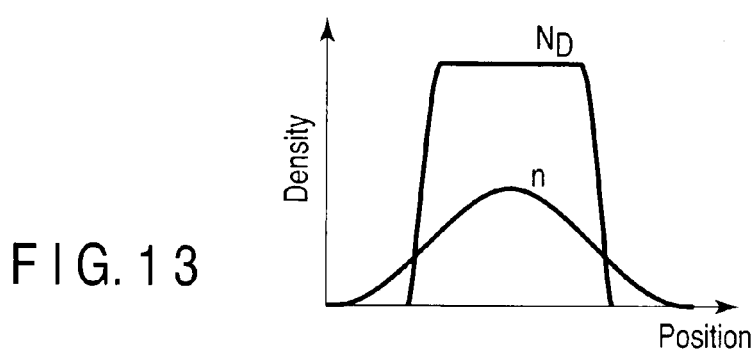
F I G. 13

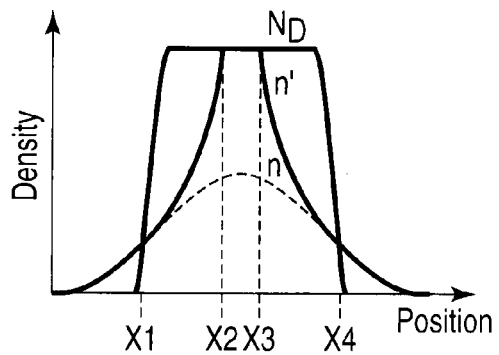
F I G. 14
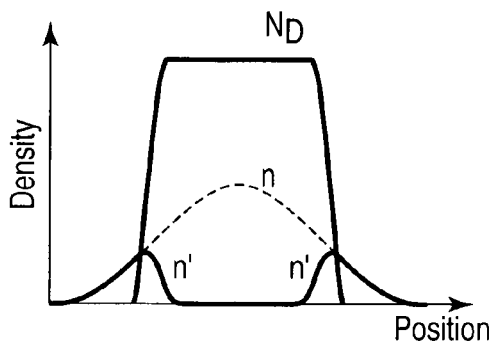
F I G. 15
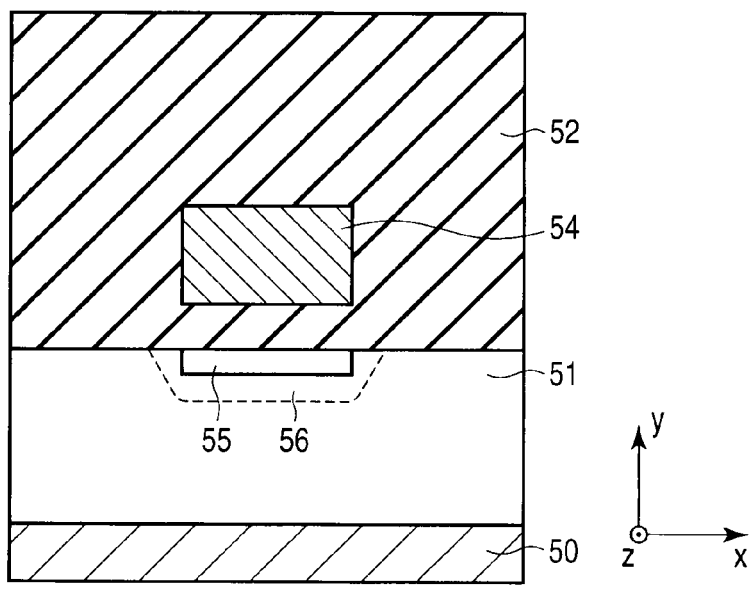
F I G. 16

SIMULATION APPARATUS FOR A SEMICONDUCTOR DEVICE

CROSS-REFERENCE TO RELATED APPLICATIONS

This application is based upon and claims the benefit of priority from prior Japanese Patent Application No. 2008-334637, filed Dec. 26, 2008, the entire contents of which are incorporated herein by reference.

BACKGROUND

For example, JP6-69493 discloses the following description. According to the description, device simulation has been known as evaluation of a semiconductor device such as an electrically characteristic analysis. According to the device simulation, potential, electron and hole distributions of the semiconductor device are analyzed using a computer.

However, according to a conventional simulation method, if a semiconductor device including an electrically floating area is given as an evaluation target, there is a problem that the analysis result is not obtained or erroneous analysis is frequently made. In other words, the semiconductor device is not correctly evaluated.

SUMMARY

A simulation apparatus of semiconductor device according to aspect of the present invention includes, a first calculator applying a voltage to an area which is a part of a semiconductor area having no electric contact with current path and functions as a virtual electrode, and setting a pseudo-Fermi level of a first conduction type carrier of a lattice point in the area to calculate a first conduction type carrier density of the lattice point;

a second calculator analyzing a current density continuous equation of a second conduction type carrier having a density smaller than the first conduction type carrier in the lattice point to calculate a second conduction type carrier density;

a third calculator using the first conduction type carrier density calculated by the first calculator as a function of an electrostatic potential of the lattice point, and solving a first simultaneous equation of the function and a Poisson's equation substituting the second conduction type carrier density calculated by the second calculator to calculate an electrostatic potential of the lattice point and the first conduction type carrier density expressed by the function;

a fourth calculator calculating a current density of the first conduction type carrier based on the first conduction type carrier density calculated by the third calculator to calculate a current flowing out of the whole of the virtual electrode; and a controller controlling the voltage applied to the virtual electrode by the first calculator based on the current calculated by the fourth calculator.

BRIEF DESCRIPTION OF THE SEVERAL VIEWS OF THE DRAWING

FIG. 4 is a schematic view showing a semiconductor device including a floating area according to a first embodiment;

FIG. 5 is a flowchart to explain a simulation method according to a first embodiment;

FIG. 6 is an enlarged view of FIG. 4;

FIG. 7 is an energy band view in the interface between a floating area and a virtual electrode;

FIG. 8 is an enlarged view of FIG. 4, and shows a terminal current running over from a virtual electrode;

FIG. 10 is an energy band view in the interface between a floating area and a virtual electrode;

FIG. 12 is an energy band view in the interface between a floating area and a virtual electrode;

FIG. 13 is a view showing the simulation result according to a first embodiment;

FIGS. 14 and 15 are graphs showing the simulation result;

FIG. 16 is a cross-sectional view showing a semiconductor device according to a second embodiment;

DETAILED DESCRIPTION OF THE INVENTION

Figure 1A:
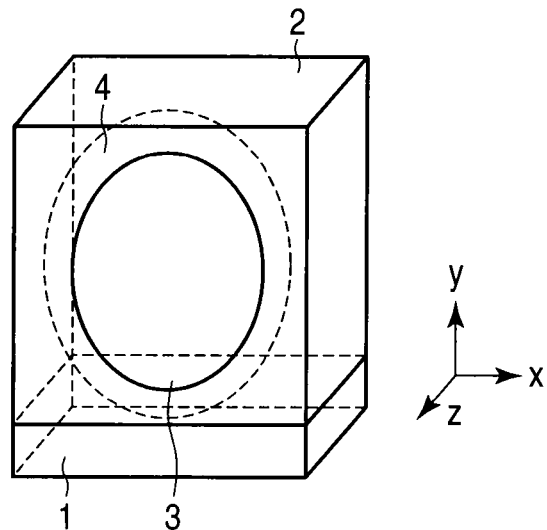
FIGS. 1A-1C are a perspective views showing a semiconductor device according to a first embodiment.

Various embodiments of the invention will be hereinafter described with reference to the accompanying drawings. In the following description, the same reference numerals are used to designate common portions over all drawings.

First Embodiment

A simulation apparatus and an analysis system according to a first embodiment of the invention will be described. Hereinafter, according to this embodiment, a device simulation apparatus analyzing electrical characteristics (e.g., electron density, hole density and electrostatic potential) will be explained using the following semiconductor device as a target. The semiconductor device includes an extrinsic semiconductor area (hereinafter, referred to as floating area FA), which is in an electrically floating state. The floating area FA is not connected to any current path because it is surrounded by an insulator and a depletion layer.

Figure 1B:
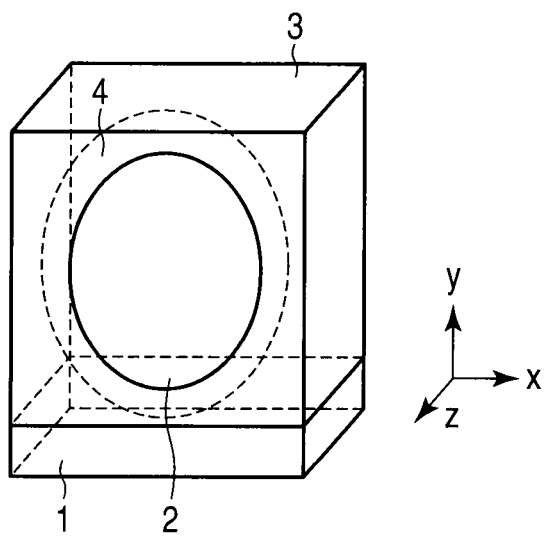
Figure 1C:
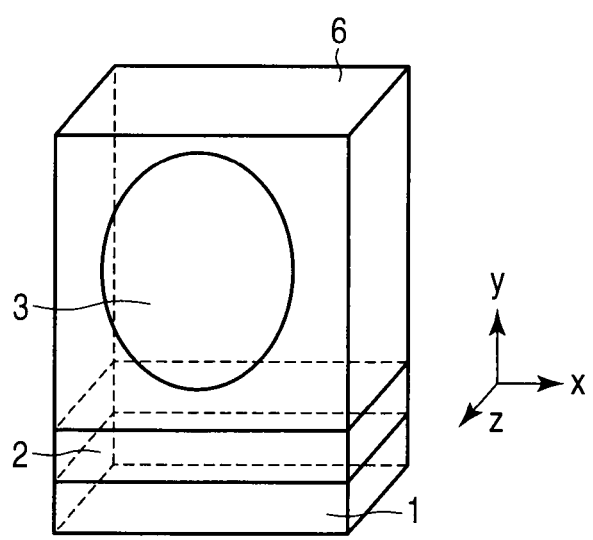

The concept of the foregoing floating area FA will be described below with reference to FIGS. 1A to 1C. FIGS. 1A to 1C are perspective view showing a semiconductor device. FIG. 1A shows the case where a semiconductor device includes an n-type semiconductor area 3 in a p-type semiconductor area 2. The p-type semiconductor area 2 is grounded via an electrode 1. In this case, electrons existing in the n-type semiconductor area 3 are coupled with holes existing in the p-type semiconductor area 2. For this reason, a depletion layer 4 composed by a donor ion density $N_D$ and an acceptor ion density $N_A$ is formed between the n-type semiconductor area 3 and the p-type semiconductor area 2. As a result, the n-type semiconductor area 3 comes into a floating area FA.

FIG. 1B shows the case where a semiconductor device includes a p-type semiconductor area 2 in an n-type semiconductor area 3. The n-type semiconductor area 2 is grounded via an electrode 1. In also case, a depletion layer 4 is formed in the same manner as FIG. 1A, and the p-type semiconductor area 2 comes into a floating area FA.

FIG. 1C shows the case where a semiconductor device includes an n-type semiconductor area 3 in an insulator 6. In this case, naturally, the n-type semiconductor area 3 comes into a floating area FA. Even if the n-type semiconductor area 3 is replaced with a p-type semiconductor area 5, the area 5 comes into a floating area FA, likewise. An electrode 1 is provided at the backside of a p-type semiconductor area 2.

<Simulation Apparatus 10>

Figure 2:
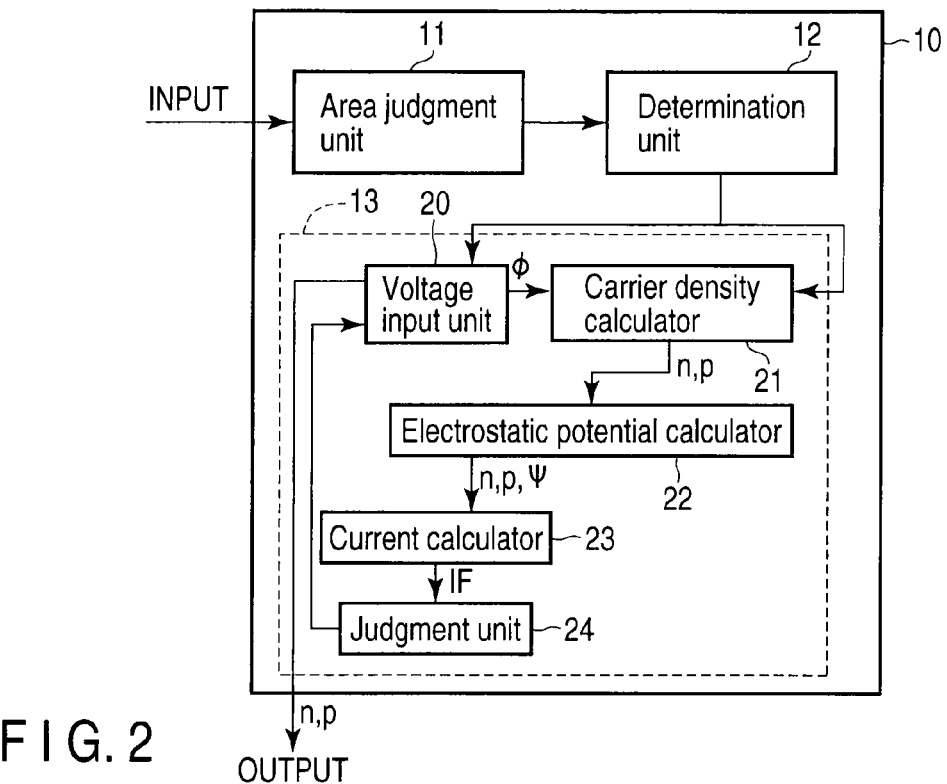
FIG. 2 is a block diagram showing the configuration of a simulation apparatus according to a first embodiment.

A simulation apparatus analyzing electrical characteristics of the foregoing floating area FA will be described below with reference to FIG. 2. FIG. 2 is a block diagram showing the configuration of a simulation apparatus according to this embodiment.

As shown in FIG. 2, a simulation apparatus 10 includes an area judgment unit 11, a determination unit 12 and a calculator 13. The simulation apparatus 10 calculates physical amounts such as electron density n, hole density p and electrostatic potential $\Psi$ of an area functioning as a virtual electrode (hereinafter, may be referred to as non-charge neutral electrode) in the foregoing floating area FA. The foregoing virtual electrode is an electrode provided for convenience sake. Namely, the virtual electrode is used for convenience sake in order to carry out simulation. Further, the virtual electrode is given as a part of a semiconductor area; however, it is handled as a metal or semiconductor in a simulation process. Therefore, a method of calculating electrical characteristic of an area regarded as the virtual electrode employs the same method as the semiconductor area. As can be seen from the foregoing description, the virtual electrode is an electrode, which dos not exist in an actual semiconductor device.

The simulation apparatus 10 uses an electron current density continuous formula, a hole current density continuous formula and Poisson's equation described later as means for analyzing electrical characteristics of the floating area FA. In general, the foregoing these simultaneous equations are called as drift diffusion model (DDM). Each circuit block will be described below.

<Area Judgment Unit 11>

The area judgment unit 11 judges the existence of a floating area FA based on a carrier density of a lattice point described later. Specifically, the area judgment unit 11 judges an inherently existing floating area FA, and further, judges an inversion layer generated by applying an external voltage, that is, the presence of a floating area FA.

<Determination Unit 12>

The determination unit 12 determines which area of the floating areas FA judged by the area judgment unit 11 functions as a virtual electrode. Specifically, a position of the area functioning as a virtual electrode may be anywhere so long as the area is a floating area FA. Preferably, a position where a depletion layer will not be generated is selected. Thereafter, the determination unit 11 supplies positional coordinate information of a lattice point of the area functioning as a virtual electrode to a voltage input unit 20 and a carrier density calculator 21.

<Calculator 13>

The calculator 13 calculates a current value flowing through the virtual electrode based on the carrier density calculated in the foregoing lattice point supplied from the determination unit 12. Further, the calculator 13 executes control so that the current value is set to zero. The direction of a current flowing through the virtual electrode changes depending on potential of the floating area FA and the magnitude of a voltage applied to the virtual electrode. In other words, if the potential of the floating area FA is higher than a voltage applied to the virtual electrode, a current flows into the virtual electrode from the floating area FA. Conversely, if the potential of the floating area FA is lower than a voltage applied to the virtual electrode, a current flows into the floating area FA from the virtual electrode. The calculator 13 controls a voltage applied to the virtual electrode so that a current flowing through the virtual electrode is set to zero. In this way, the calculator 13 calculates electron density n, hole density p and electrostatic potential $\Psi$ of the floating area and the virtual electrode.

The details of the calculator 13 will be described below. As shown in FIG. 2, the calculator 13 includes a voltage input unit 20, a carrier density calculator 21, an electrostatic potential calculator 22, a current calculator 23 and a judgment unit 24. Hereinafter, the foregoing calculator and unit will be described.

<Voltage Input Unit 20>

The voltage input unit 20 controls the magnitude of a voltage applied to a virtual electrode according to the control of the judgment unit 24. In this way, the voltage input unit 20 sets a pseudo-Fermi level of an electron or hole of a lattice point of a virtual electrode. Namely, the voltage input unit 20 decrease or increase a voltage applied to the electrode in accordance with a signal received from the judgment unit 24. In this way, the voltage input unit 20 sets each density distribution of electron or hole.

<Carrier Density Calculator 21>

The carrier density calculator 21 analyzes a current density continuous equation with respect to electron or hole of the lattice point supplied from the foregoing determination unit 12. Specifically, the calculator 21 calculates an increase of carriers per unit time/unit volume of the floating area FA to obtain density distribution of electron or hole. In this case, external factors, for example, drift current and diffusion current of electron or hole and light radiation are given as a factor of the increase of carriers.

<Electrostatic Potential Calculator 22>

The electrostatic potential calculator 22 analyzes a Poisson's equation based on density distribution of electron or hole calculated by the foregoing voltage input unit 20 and carrier density calculator 21. In this way, the calculator 22 calculates electrostatic potential $\Psi$ of the floating area, that is, potential of the floating area, electron density n and hole density p.

<Current Calculator 23>

The current calculator 23 calculates an electron or hole current density based on electrostatic potential $\Psi$ and electron density n or hole density p, which are calculated from simultaneous equations of the voltage input unit 20, the carrier density calculator 21 and the electrostatic potential calculator 22. Then, the current calculator 23 calculates volume integral and surface integral of the whole of a virtual electrode based on the calculated electron or hole current density. In this way, the current calculator 22 calculates a terminal current IF flowing through the electrode (hereinafter, expressed as flow-out).

<Judgment Unit 24>

The judgment unit 24 controls a voltage applied to the virtual electrode by the voltage input unit 20 based on a terminal current IF flowing through the foregoing electrode and a voltage applied to the virtual electrode. In this case, the judgment unit 24 executes the control so that a current flowing through the virtual electrode is set to zero. In other words, the judgment unit 24 executes the control so that a pseudo-Fermi level of electrons of the floating area FA coincides with a pseudo-Fermi level of electrons of an area regarded as a virtual electrode. In this case, the judgment unit 24 gives instructions to decrease or increase a voltage to the voltage input unit 20, or gives a concrete voltage value.

For example, the potential of the floating area FA changes from potential $VOL_k$ at time tk (k is a natural number) by photoelectric effect. In other words, the floating area FA becomes a thermal non-equilibration state; namely, an excess phenomenon such that potential changes with time occurs. In this case, the judgment unit 24 calculates a potential of the floating area FA at time tk using a current IF per unit time flowing through the virtual electrode and the capacity CF of the floating area. The relationship in an excess state is expressed by the following formula (1).

$$VOL_{(k+1)} = VOL_k + \frac{IF\Delta t}{CF} \quad (1)$$

where, $VOL_k$ is a potential of a floating area FA at time t=k, and $VOL_{(k+1)}$ is a potential at time t=(K+1).

The judgment unit 24 measures a voltage $VOL_{(k+1)}$ shown in the foregoing formula (1), and simultaneously, applies the measured voltage $VOL_{(k+1)}$ to the virtual electrode so that a terminal current IF flowing out of the virtual electrode is set to 0 ampere [A].

The capacity CF of the floating area FA may be previously calculated. However, in view of a change in electrical characteristics of the floating area FA, the judgment unit 24 calculates a voltage applied by the voltage input unit 20 while measuring the capacity varying in accordance with time. Specifically, the judgment unit 24 observes an alternate small signal flowing through the virtual electrode and the electrode 1 to measure the capacity stored in the floating area FA. In this case, any of units forming the calculator 13 calculates the capacity of the floating area FA.

<Operation of the Simulation Apparatus 10>

Figure 3:
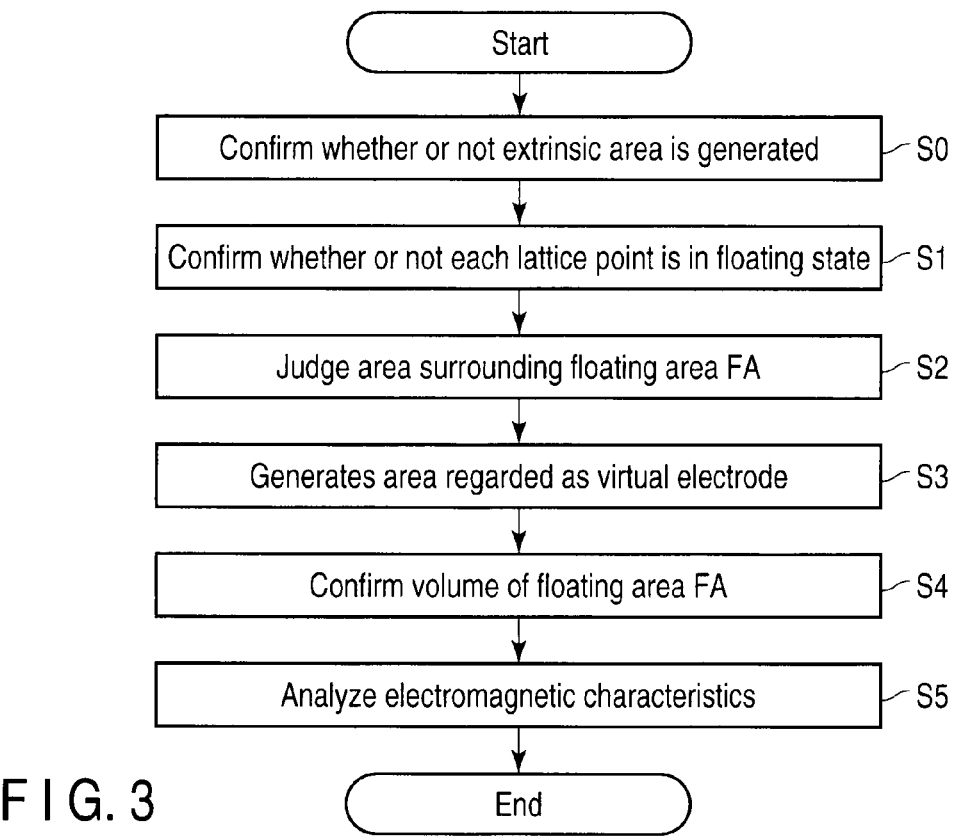
FIG. 3 is a flowchart to explain a simulation method according to a first embodiment.

The operation of the foregoing simulation apparatus 10 will be explained with reference to FIG. 3. FIG. 3 is a flowchart to explain a simulation method according to this embodiment.

<Step S0>

The area judgment unit 11 confirms whether or not an extrinsic semiconductor area is generated in a semiconductor device given as a simulation target. The details of step S0 will be described below. In step S0, the area judgment unit 11 divides a semiconductor device into a plurality of squares so that no clearance and overlap is generated. This state is shown in FIG. 4. FIG. 4 is a schematic view two-dimensionally showing the semiconductor device shown in any of FIGS. 1A to 1C. Specifically, in FIG. 4, an area shown by an ellipse is an extrinsic semiconductor area. The outer side of the ellipse is an insulator or extrinsic semiconductor area. Hereinafter, the paper surface is given as an x-y surface, and the vertical direction of the paper surface is given as a z-axis.

As can be seen from FIG. 4, the area judgment unit 11 gives a lattice point $l_i$ (i: natural number) to each vertex of a square. Then, the unit 11 measures a carrier density of the lattice point $l_i$. As a result, if an electron density n is more than a hole density p in a lattice point $l_i$, the lattice point $l_i$ is called as an electron excess lattice point. Conversely, if an electron density n is less than a hole density p in a lattice point $l_i$, the lattice point $l_i$ is called as a hole excess lattice point. The area judgment unit 11 judges that an extrinsic semiconductor area is generated if any lattice point $l_i$ is an electron excess lattice point or hole excess lattice point. In this way, each lattice point $l_i$ is judged whether it is an n-type area or p-type area.

The area judgment unit 11 performs the procedure of the foregoing step S0 with respect to all of the lattice point $l_i$. If all lattice points $l_i$ are neither electron nor hole excess lattice point, the unit 11 judges that an extrinsic semiconductor area is not generated, and then, ends the procedure. Conversely, if the extrinsic semiconductor area is generated, the unit 11 proceeds to step S1.

<Step S1>

The area judgment unit 11 confirms whether or not the lattice point $l_i$ forming the extrinsic semiconductor area, that is, an electron excess or hole excess lattice point is in an electrically floating state. In order to explain this step in detail, the case where the lattice point $l_i$ is an electron excess lattice point is given as one example. The same procedure is performed in the case where the lattice point $l_i$ is a hole excess lattice point.

For example, the area judgment unit 11 forms a path to the electrode 1 using the lattice point li regarded as the electron excess lattice point as a base point. Specifically, the path is formed in the following manner of connecting each side of a square formed lattice points $l_j$ adjacent to the lattice point $l_i$, all lattice points on the path are electron excess lattice points. As a result, if the path to the electrode 1 is not formed, the unit 11 judges that these lattice points $l_i$ are electrically floating. Such an electrically floating electron excess lattice point is hereinafter called as an electron excess floating lattice point. On the other hand, an electrically floating hole excess lattice point is hereinafter called as a hole excess floating lattice point.

The area judgment unit 11 performs the foregoing procedure with respect to all lattice points $l_i$. When the procedure ends with respect to all lattice points $l_i$, if all lattice points $l_i$ are not an electron excess floating lattice point; in other words, if a path to the electrode 1 is formed, the simulation apparatus ends the analysis. Conversely, if any lattice points $l_i$ is an electron excess floating lattice point, the unit 11 proceeds to step S2.

<Step S2>

The area judgment unit 11 measures a carrier density of each lattice point $l_i$ of areas arranged around the semiconductor area including the lattice point $l_i$, which is judged as being electrically floating. In this way, it is judged whether the surroundings of the semiconductor area judged as being electrically floating are an area having extrinsic property different from the semiconductor area or an insulator. In this case, information on the foregoing surrounding area may be externally given in place of the judgment by the area judgment unit 11.

<Step S3>

The determination unit 12 determines an area functioning as a virtual electrode in the foregoing extrinsic semiconductor area. First, the determination unit 12 acquires information that any lattice point $l_i$ is an electron excess floating lattice point from the area judgment unit 11. Then, the unit 12 gives a function as a virtual electrode to any square area having the lattice point $l_i$ judged as an electron excess floating lattice point as the vertex (the same procedure as above is performed with respect to the case of hole excess floating lattice point). Thereafter, the flow proceeds to the procedure of step S4.

<Step S4>

The area judgment unit 11 confirms a range of the floating area FA based on electron excess floating lattice points judged in step S3. The same procedure as above is performed with respect to hole excess floating lattice points. The details of step S4 will be explained below.

The area judgment unit 11 sets control volume CV to each of the foregoing electron excess floating lattice points. The control volume CV is a space three-dimensionally surrounding the lattice point. The space is set so that the distance from an arbitrary position in the space to the lattice point $l_i$ to which the space belongs becomes shorter than the distance to other lattice point.

The area judgment unit 11 sets the control volume CV with respect to all electron excess floating lattice points, and thereafter, judges an area collecting these lattice points as one floating area FA. Namely, in this case, the control volume CV distributes so that part of the CV is provided an actually electrical floating area of the extrinsic areas.

Therefore, when the volume of the control volume $CV_i$ corresponding to one lattice point $l_i$ is set to $V_i$ and the number of lattice points included in the floating area FA is N (N: natural number), the volume of the floating area FA is N·Vi.

The flow proceeds to step S5.

<Step S5>

The calculator 13 analyzes electrical characteristics of the floating area FA. According to the analysis, the calculator 13 analyzes electrical characteristics at a unit of the control volume $CV_i$ set for each lattice point by the area judgment unit 11. The calculator 13 acquires information that an area corresponding to each lattice point is an n-type area or a p-type area or an insulator. A different analysis method is employed with respect to the following three cases. Specifically, CASE I: Floating area FA is an n-type, and the surroundings are a p-type CASE II: Floating area FA is a p-type, and the surroundings are an n-type CASE III: Floating area FA is an n-type or p-type, and the surroundings are an insulator The details of the procedure by the calculator 13 with respect to each case will be explained below.

<CASE I>

The CASE I will be explained below with reference to FIG. 5. The CASE I corresponds to the case of FIG. 1A. FIG. 5 shows the details of steps S5 in CASE I.

<<Step S10>>

The carrier density calculator 21 sets a pseudo-Fermi level of electron of each lattice point to calculate an electron density n. Hereinafter, this procedure will be explained. An area given as a virtual electrode will be explained with reference to FIG. 6. FIG. 6 is a schematic view enlarging a square dividing the floating area FA in FIG. 4.

The following assumption is given; namely, as shown in FIG. 6, an area comprising a square formed of lattice points $l_{107}$ to $l_{109}$, $l_{112}$ to $l_{114}$ and $l_{117}$ to $l_{119}$ functions as a virtual electrode. The paper surface shows an x-y plane where z=0. The x-y plane where z=0 is set as the interface between an n-type semiconductor area and a virtual electrode. Of course, the virtual electrode has a thickness in the z-axis direction; however, for convenience of the paper surface, illustration is omitted in FIG. 6. Namely, lattice points $l_{107}$ to $l_{109}$, $l_{112}$ to $l_{114}$ and $l_{117}$ to $l_{119}$ are arranged on the interface. A range of $z \geq 0$ is regarded as a virtual electrode using the interface as the boundary, and a range of z<0 is regarded as an n-type semiconductor area.

The voltage input unit 20 applies a voltage to the lattice point $l_i$ functioning as the virtual electrode. Namely, the voltage input unit 20 designates a pseudo-Fermi level of electron of the lattice point $l_i$, and thereby, sets an electron density $n_i$ of the lattice point $l_i$. This state will be explained below with reference to FIG. 7. FIG. 7 shows an energy state at the interface between the virtual electrode and the floating area FA shown in FIG. 6, for example, a state at the lattice point $l_{107}$. In FIG. 7, $E_c$ denotes the bottom energy level of a conduction band, and $E_v$ denotes an energy level of a valence band. A value larger than the conduction band Ec by $\chi$ is set as a semiconductor vacuum level $q\Psi$. The foregoing $\chi$ denotes an electron affinity. As described above using FIG. 6, it is assumed that lattice points $l_i$ arranged in the range of $z \geq 0$ are arranged at the side of the virtual electrode (expressed as an area A in FIG. 7). The lattice point $l_{107}$ in the interface (z=0) is set as a lattice point $l_{a,107,1}$. Further, a lattice point $l_{a,107,2}$, a lattice point $l_{a,107,3}$, ..., a lattice point $l_{a,107,n}$ are successively arranged toward the $z \geq 0$ direction, that is, toward the inside from the surface of an area functioning as a virtual electrode.

The voltage input unit 20 applies a voltage to each of all lattice points $l_{a,107,1}$ to $l_{a,107,n}$ corresponding to the lattice point $l_{107}$, and thereby, sets an electron density n corresponding to each of lattice points $l_{a,107,1}$ to $l_{a,107,n}$. The lattice point $l_{107}$ is explained in particular; in this case, other lattice points $l_i$ are set in the same manner as above.

Namely, the voltage input unit 20 controls the magnitude of a voltage applied to the virtual electrode, and thereby, sets an electron pseudo-Fermi level of the lattice point $l_{a,107,n}$ in the virtual electrode area. Specifically, the voltage input unit 20 sets an application voltage Vappl (energy) given to the lattice point $l_{a,107,n}$ regarded as a virtual electrode as an electron pseudo-Fermi potential $\phi$. In this case, a pseudo-Fermi level is used for the floating area FA resulting from the following reason. For example, the floating area FA becomes a thermal equilibration state due to an external influence such as light radiation; for this reason, a Fermi level is not designated. If the floating area FA becomes a thermal non-equilibration state, a pseudo-Fermi level coincides with a Fermi level.

The relationship between a pseudo-Fermi potential $\phi$ of a lattice point $l_{a,i,n}$ and application voltage Vappl is expressed by the following formula (2).

$$\phi e, i = V\text{appl} \tag{2}$$

Therefore, an electron pseudo-Fermi level $E_{Fe,ain}$ of the lattice point $l_{a,i,n}$ is expressed by the following formula (3).

$$E_{Fe,ain} = -q\phi_{e,I} \tag{3}$$

where, $\phi_{e,I}$ is an electron pseudo-Fermi potential.

Thus, an electron density $n_{a,i}$ of the foregoing lattice point $l_{a,i,n}$ is expressed by the following formula (4).

$$n_{a,i} = N_C \exp\left(-\frac{E_C - E_{Fe,ain}}{k_B T}\right) \tag{4}$$

where, q is an elementary charge, $K_B$ is a Boltzmann's constant, T is an absolute temperature of all lattice points li forming floating area FA, and $N_c$ is an effective state density of a conduction band.

In this case, the foregoing $N_c$ is expressed by the following formula (5).

$$N_C \equiv 2\left(\frac{2\pi m_e^* k_B T}{h^2}\right)^{\frac{3}{2}} \tag{5}$$

where, h is a Planck's constant, and me* is a conduction band electron effective mass.

In general, electron density n and hole density p are expressed by the following formulas (6) and (7).

$$n = N_c \exp\left(\frac{E_{Fe} - E_c + \delta E_c}{k_B T}\right) \quad (6)$$

$$p = N_v \exp\left(\frac{E_v + \delta E_v - E_{Fh}}{k_B T}\right) \quad (7)$$

where, $\delta E_c$ and $\delta E_v$ are band gap narrowing effects of the conduction and the valance band, respectively. $E_{Fe}$ is an electron pseudo-Fermi level, and $E_{Fh}$ is a hole pseudo-Fermi level. $N_v$ is a valance band effective state density.

An effective intrinsic carrier density $n_{ie}$ is expressed by the following formula (8) based on the foregoing formulas (6), (7) and $n \times p = n_{ie}^2$.

$$n_{ie} = \sqrt{N_c N_v} \exp\left(\frac{-E_g + \delta E_c + \delta E_v}{2 k_B T}\right) \quad (8)$$

where, $E_g = (E_c - E_v)$.

The foregoing formulas (6) and (7) are expressed by the following formulas (9) and (10) using the above formula (8), respectively.

$$n = n_{ie} \exp\left(\frac{E_{Fe} - E_i}{k_B T}\right) \quad (9)$$

$$p = n_{ie} \exp\left(\frac{E_i - E_{Fh}}{k_B T}\right) \quad (10)$$

where, $E_i$ is an intrinsic Fermi level, and expressed by the following formula (11).

$$E_i = -q\Psi - \chi - \frac{E_c - \delta E_c + E_v + \delta E_v}{2} + \frac{k_B T}{2} \ln\left(\frac{N_v}{N_c}\right) \quad (11)$$

where, an intrinsic Fermi level of lattice point $l_{a,i,n}$ is expressed as $E_{a,i,n}$. As described above, $Ec + \chi = -q\Psi$.

The foregoing formula (4) is expressed by the following formula (12) using an effective intrinsic carrier density $n_{ie}$ and an intrinsic Fermi level $E_{a,i,n}$.

$$n_{a,i} = n_{ie} \exp\left(\frac{E_{Fe,ain} - E_{a,i,n}}{k_B T_i}\right) \quad (12)$$

In this way, an electron density $n_{a,i}$ of the lattice point $l_{a,i,n}$ is set. This is because an electron pseudo-Fermi level of the lattice point $l_{a,i,n}$ positioning in the area regarded as the virtual electrode is set by the foregoing formula (12) to determine an electron density $n_{a,i}$ of the lattice point $l_{a,i,n}$.

<<Step S11>>

The carrier density calculator 21 calculates a hole density p of the lattice points $l_i$ using a hole current density continuous formula. The hole current density continuous formula is a partial differential equation. However, in this case, volume integral of the partial differential equation in these lattice points $l_i$ is made, and thereafter, Gauss's theorem is applied.

Hereinafter, for simplification, a method of calculating a hole density p using control volume $CV_i$ corresponding to the lattice point $l_i$ will be described. The control volume $CV_i$ is set in the following manner. FIG. 4 shows a state that a floating area FA is formed, and control volume $CV_i$ corresponding to the lattice point $l_i$ is set. As can be seen from FIG. 4, the control volume $CV_i$ corresponding to the lattice point $l_i$ is a part for forming the floating area FA, and the surface of the control volume $CV_i$ is set as $\partial CV_i$. As shown in FIG. 4, lattice points $l_j$ are arranged adjacent to up and down and right and left of the lattice point $l_i$.

Lattice points adjacent to the lattice point $l_i$ in the x-axis direction have a relation of j=i−1, i+1. Lattice points adjacent to the lattice point $l_i$ in the y-axis direction have a relation of j=i−m, i+m. In this case, m is equal to the number of lattice points existing in the x-axis direction (m is a natural number).

The side when the lattice point $l_i$ is given as the start point and the end point is given as the lattice point $l_j$ is expressed as $E_{i,j}$, and the length of the side $E_{i,j}$ is set as $d_{i,j}$. Of the surfaces $\partial CV_i$ of the control volume $CV_i$, the surface crossing the side $E_{i,j}$ is set as $\partial CV_{i,j}$, and the area of $\partial CV_{i,j}$ is set as $A_{i,j}$. Namely, electrical characteristics for each lattice point $l_i$ are analyzed, and thereby, electrical characteristics of the floating area FA composed of the lattice points $l_i$ are analyzed.

In this way, an area regarded as a virtual electrode, that is, an hole density $p_{a,i}$ of a target lattice point $l_{a,i,n}$ is calculated. The hole current density continuous equation is expressed by the following formula (13).

$$\frac{\partial}{\partial t}(q p_{a,i} V_i) + \sum_j J_{p,i,j} A_{i,j} - q GR_i V_i = 0 \quad (13)$$

where, $J_{p,i,j}$ is a hole current density vector, and GR is a carrier formation recombination coefficient. In this case, $J_{p,i,j}$ is a hole current density flowing through side $E_{i,j}$ from lattice point $l_{a,i,n}$ toward lattice $l_{a,j,n}$. Namely, the second item of the left side of the formula (13) shows a hole current flowing to lattice point $l_{a,i,n}$ arranged around the lattice point $l_{a,i,n}$ from lattice point $l_{a,i,n}$. Because, a current $I_{i,j}$ flowing from lattice point $l_{a,i,n}$ toward lattice point $l_{a,j,n}$ is expressed as $I_{i,j}$ [A]=$A_{i,j}$ [m²]×$J_{i,j}$ [A/m²].

<<Step S12>>

The electrostatic potential calculator 22 solve a Poisson's equation using the hole density $p_{a,i}$ obtained in step S11 and the electron density $n_{a,i}$ obtained in step S10. In this way, an electrostatic potential $\Psi_{a,i,n}$ of the lattice point $l_{a,i,n}$ of an area regarded as a virtual electrode is calculated. The Poisson's equation is also a partial differential equation like hole current density continuous equation. In this case, volume integral of the partial differential equation is made at the lattice point $l_{a,i,n}$, and thereafter, Gauss's theorem is further applied. The Poisson's equation is expressed by the following formula (14).

$$\sum_j A_{i,j}\left(-\varepsilon_{r,i} \varepsilon_0 \frac{\Psi_j - \Psi_i}{d_{i,j}}\right) - q(p_{a,i} - n_{a,i} - N_{A,i} + N_{D,i}) V_i = 0 \quad (14)$$

where, $\varepsilon_0$ is a vacuum permittivity, and $\varepsilon_{r,i}$ is a dielectric constant of lattice point $l_i$. $\Psi_i$ is an electrostatic potential of lattice point $l_i$, and $\Psi_j$ is an electrostatic potential of lattice point $l_j$. NA,I is an acceptor ion density of lattice point $l_i$, and ND,i is a donor ion density of lattice point $l_i$. "j" used in the foregoing formula (14) is a number given to lattice point adjacent to lattice point $l_i$.

The electron density $n_{a,i}$ of the foregoing formula (14) is regarded as a function $n\,(\Psi_i)$ with $\Psi_i$. Simultaneously, $n\,(\Psi_i)$ is a function of $\phi_{e,i}$ from the formulas (3) and (4). Namely, the electron density $n_{a,i}$ is a function $n\,(\Psi_i, \phi_{e,i})$ of $\Psi_i$ and $\phi_{e,i}$. Therefore, Poisson's equation is further expressed by the following formula (15).

$$\sum_j A_{i,j}\left(-\varepsilon_{r,i}\varepsilon_0 \frac{\Psi_j - \Psi_i}{d_{i,j}}\right) - q(p_{a,i} - n(\Psi_i, \varphi_{e,i}) - N_{A,i} + N_{D,i})V_i = 0 \quad (15)$$

The foregoing formula (12) is expressed by the following formula (16) using the foregoing formulas (3), (8) and (11).

$$n(\Psi_i, \varphi_{e,i}) = \sqrt{N_c N_v} \exp\left(\frac{-E_g + \delta E_c + \delta E_v}{2k_B T}\right) \times$$

$$\exp\left(\frac{E_{Fe,ain}}{k_B T_i} - \frac{1}{k_B T_i}\left(-q\Psi_i - \chi - \frac{E_c - \delta E_c +}{2} + \frac{k_B T}{2}\ln\left(\frac{N_v}{N_c}\right)\right)\right) \quad (16)$$

Then, a simultaneous equation of the foregoing formulas (15) and (16) is solved. In this way, the electrostatic potential $\Psi_{a,i,n}$ of the lattice point $l_{a,i,n}$ of an area regarded as a virtual electrode, that is, the potential of the floating area FA is calculated.

<<Step S13>>

The current calculator 23 calculates an electron current density $J_e$ flowing out of the unit area of the virtual electrode using the electron density $n_{a,i}$ calculated from the foregoing formulas (15) and (16).

First, an electron current density $J_e$ flowing out of the unit area of the virtual electrode using the electron density $n_{a,i}$. The electron current density $J_e$ is expressed by the following formula (17).

$$\vec{J}_e = -q\mu n_{a,i} \nabla \phi_{e,i} \quad (17)$$

where, "$J_e$" is a vector component of electron current density $J_e$, and $\mu$ is an electron mobility. $\phi_{e,i}$ is an electron pseudo-Fermi potential of the lattice point $l_{a,i,n}$, as described above, and thus, easily calculated from the electron density $n_{a,i}$.

In FIGS. 4 and 6, the floating area is two-dimensionally illustrated; however, an actual simulation is three-dimensionally carried out. For this reason, the foregoing calculation is three-dimensionally carried out with respect to portions regarded as the virtual electrode. Namely, the foregoing calculation is carried out with respect to the inside of the virtual electrode corresponding to an area of z≧0. In other words, the foregoing calculation is carried out with respect to a range from a virtual electrode $a_{a,j,1}$ to $a_{a,i,n}$. The flow proceeds to step S14.

<<Step S14>>

The calculator 13 confirms whether or not analysis from steps S10 to S13 is made with respect to all lattice points $l_i$ of the virtual electrode, that is, arrange from the surface to the inside of the area regarded as the virtual electrode. If the procedure of the foregoing steps from S10 to S13 is performed with respect to all lattice points $l_i$ regarded as the virtual electrode (YES in step S14), the flow proceeds to step S15. Conversely, if analysis with respect to all lattice points $l_i$ is not completed (NO in step S14), the simulation apparatus repeats the procedure of the foregoing steps from S10 to S13.

<<Step S15>>

The current calculator 23 executes volume or area integral of the whole of electrode with respect to the electron current density Je calculated based on the electron density $n_{a,i}$ of all lattice points $l_i$. In this way, the current calculator 23 calculates a terminal current IF flowing out of the electrode. Hereinafter, the procedure of calculating a terminal current IF flowing out of a virtual electrode by the current calculator 23 will be described.

The method of calculating a terminal current IF flowing out of the whole of a virtual electrode will be described below with reference to FIG. 8, for simplification. FIG. 8 is two-dimensionally illustrated, and shows a terminal current IF flowing out of a virtual electrode of a floating area FA. The terminal current IF is the difference between currents passing through the inside and outside of the virtual electrode.

An area of the virtual electrode composed of areas from lattice points $l_{107}$ to $l_{109}$, $l_{112}$ to $l_{114}$, and $l_{117}$ to $l_{119}$ is shown by slant lines. The terminal current IF flowing out of the virtual electrode is expressed by the following formula (18).

$$IF = (IF_{out} - IF_{in}) = \quad (18)$$
$$(I_{107,102} + I_{108,103} + I_{109,104} + I_{109,110} + I_{114,115} + I_{119,120} +$$
$$I_{119,124} + I_{118,123} + I_{117,122} + I_{117,116} + I_{112,111} +$$
$$I_{107,106}) - (I_{113,108} + I_{113,114} + I_{113,118} + I_{113,112})$$

where, $IF_{out}$ is a current flowing from the surface to the outside of virtual electrode, and $IF_{in}$ is a current flowing from the inside to the surface of virtual electrode. For example, an additional character (107, 102) shows a current component flowing from the lattice point $l_{107}$ of the virtual electrode to the lattice point $l_{102}$ thereof.

According to the foregoing calculation method, two-dimensional terminal current IF is calculated. However, actually, a terminal current IF considering the z≧0 direction, that is, the thickness of the virtual electrode is calculated. Namely, volume or area integral of the virtual electrode is carried out with respect to the electron current density $J_e$ flowing out of the virtual electrode. In this way, a terminal current IF flowing out of the whole of the virtual electrode is calculated. In other words, the terminal current IF is expressed by the following formula (19).

$$IF = \int_{\partial\Omega} \vec{J}_e \cdot d\vec{s} = \int_\Omega div \vec{J}_e dv \quad (19)$$

where, $\partial\Omega$ denotes a micro area where electron current density $J_e$ flows out, and $\Omega$ denotes the entire area of virtual electrode. The flow proceeds to step S16.

<<Step S16>>

After step S15, the judgment unit 24 controls a voltage applied to the virtual electrode by the voltage input unit 20 in accordance with the terminal current IF flowing out of the virtual electrode. Namely, the judgment unit 24 executes the control so that the terminal current IF given from the current calculator 23 is set to zero. In this way, the electron density $n_{a,i}$ of the floating area FA and the electrostatic potential $\Psi_{a,i,n}$, that is, potential are each confirmed.

As described above, the judgment unit 24 controls the terminal current IF flowing out of the virtual electrode, and thereby, the simulation apparatus 10 calculates electrical characteristics of the floating area FA. For example, even if the floating area FA is a thermal non-equilibration state due to photoelectric effect, the judgment unit executes the following control. According to the foregoing control, the judgment unit 24 executes the control so that the potential of the floating area FA coincides with the voltage applied to the virtual electrode using a current flowing out of the virtual electrode thus calculated and the capacity stored in the floating area FA.

<CASE II>

Figure 9:
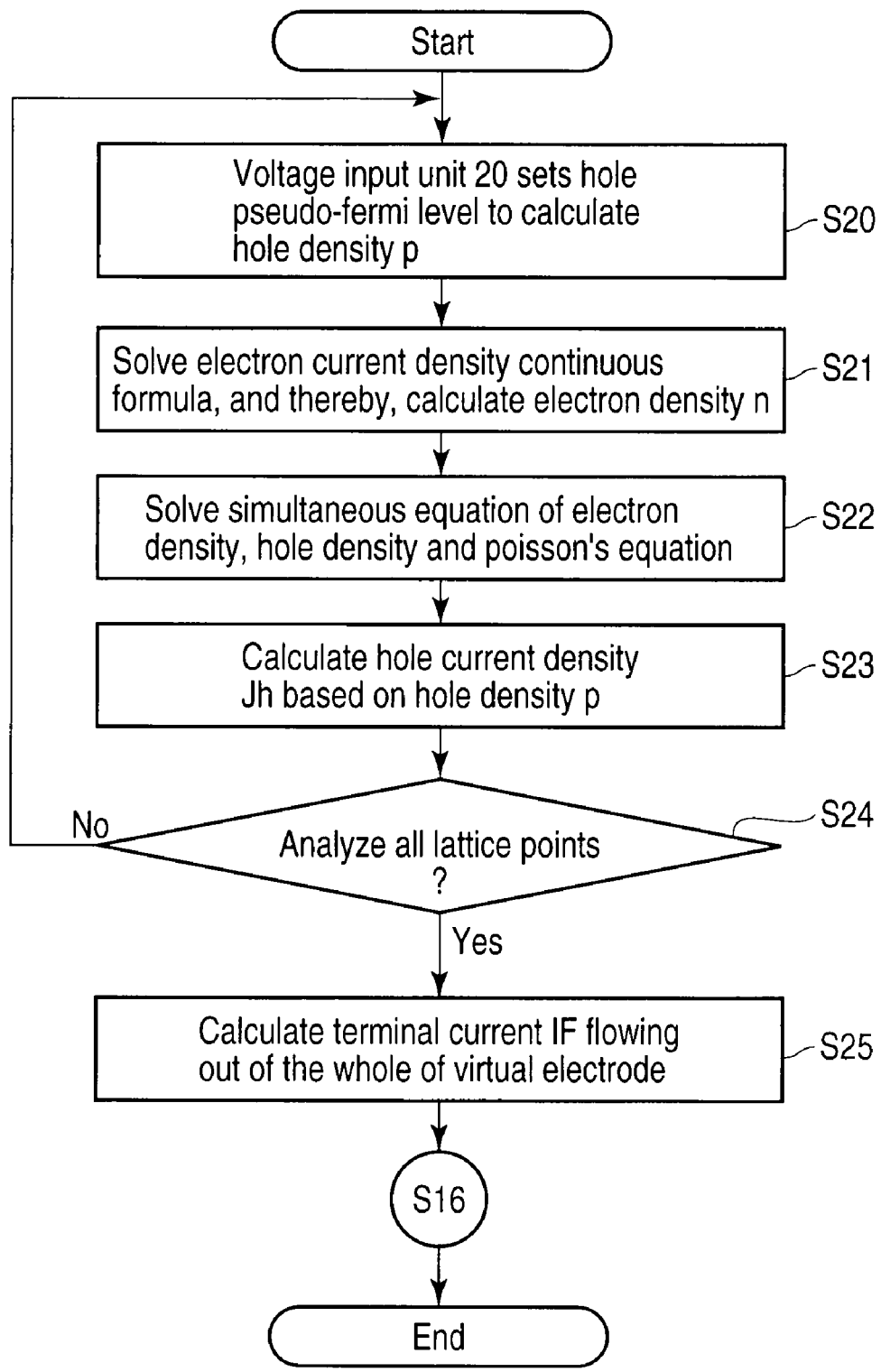
FIG. 9 is a flowchart to explain a simulation method according to a first embodiment.

The foregoing CASE II will be explained below with reference to FIG. 9. FIG. 9 shows the details of step S5 in CASE II.

<<Step S20>>

The voltage input unit 20 sets a hole pseudo-Fermi level of each lattice point to calculate a hole density p. This procedure is performed with respect to hole in the same manner as performed with respect to electron in CASE I. Like CASE I, it is assumed that an area shown in FIG. 6 functions as a virtual electrode.

The voltage input unit 20 applies a voltage to a lattice point $l_i$ functioning as a virtual electrode, like CASE I. Namely, the voltage input unit 20 designates a hole pseudo-Fermi level of the virtual electrode lattice point $l_i$, and thereby, sets a hole density $p_i$ of the lattice point $l_i$. This state will be described below with reference to FIG. 10. FIG. 10 is an energy band view at the interface between the virtual electrode and the floating area FA shown in FIG. 6, and shows a state of the lattice point $l_{107}$, like FIG. 7. Lattice points $l_i$ arranged in a range of $z \geq 0$ are given as the side of the virtual electrode (area C is shown in FIG. 10). In $z=0$, the lattice point li shown in FIG. 6 is arranged. For example, the lattice point $l_{107}$ of the interface ($z=0$) is set as $l_{c,107,i}$; namely, lattice points $l_{c,107,2}$, $l_{c,107,3}$, ... $l_{c,107,n}$ are arranged toward the $z \geq 0$ direction, that is, from the surface of the area regarded as virtual electrode to the inside.

The voltage input unit 20 applies a voltage to all lattice points $l_{c,107,I}$ to $l_{c,107,n}$, like CASE I, and thereby, sets a hole density p corresponding to each lattice point. The same procedure as above is performed with respect to other lattice point $l_i$, like the lattice point $l_{107}$. The voltage input unit 20 controls the magnitude of the voltage applied to the virtual electrode, and thereby, sets a hole pseudo-Fermi level of the lattice point $l_{c,i,n}$ of the virtual electrode. In this way, a hole density $p_{c,i}$ of the lattice point $l_{c,i,n}$ is set.

Specifically, the voltage input unit 20 sets an application voltage Vappl (energy) given to the lattice point $l_{c,i,n}$ regarded as the virtual electrode as a hole pseudo-Fermi potential $\phi_{h,i}$. Like CASE I, the relationship between the hole pseudo-Fermi potential $\phi_{h,i}$ and the application voltage Vappl is expressed by the following formula (20).

$$\phi_{h,i} = \text{Vappl} \quad (20)$$

Therefore, a hole pseudo-Fermi potential $E_{Fh,c}{}^i{}_n$ of the lattice point $l_{c,i,n}$ is expressed by the following formula (21).

$$E_{Fh,cin} = -q\phi_{h,I} \quad (21)$$

Thus, a hole density $p_{c,i}$ is set by the following formula (21). The hole density $p_{c,i}$ is expressed by the following formula (22).

$$p_{c,i} = N_v \exp\left(\frac{E_v - E_{Fh,cin}}{k_B T_i}\right) \quad (22)$$

where, $N_v$ is an effective state density of a valance band. $N_v$ is expressed by the following formula (23).

$$N_v \equiv 2\left(\frac{2\pi m_h * k_B T}{h^2}\right)^{\frac{3}{2}} \quad (23)$$

where, $m_h$ is a valance band hole effective mass. An intrinsic Fermi level of lattice point $l_{c,i,n}$ is set as $E_{c,i,n}$.

The foregoing formula (22) is expressed by the following formula (24) using an effective intrinsic carrier density.

$$p_{c,i} = n_{ie} \exp\left(\frac{E_{c,i,n} - E_{Fh,cin}}{k_B T_i}\right) \quad (24)$$

In this way, the hole density $p_{c,i}$ of the lattice point $l_{c,i,n}$ is set. This is because a hole pseudo-Fermi level of the lattice point $l_{c,i,n}$ positioning at the area regarded as the virtual electrode is set by the foregoing formula (24) in order to determine the hole density $p_{c,i}$ of the lattice point $l_{c,i,n}$.

<<Step S21>>

The carrier density calculator 21 calculates an electron density $n_{c,i}$ of the lattice point $l_{c,i,n}$ using an electron current density continuous equation. Namely, in this case, an electron pseudo-Fermi level of the lattice point $l_{c,i,n}$ in the area C regarded as a virtual electrode is the unknown value. Like CASE I, volume integral of the lattice point $l_{c,i,n}$ is performed using a partial differential equation, that is, an electron current density continuous equation, and thereafter, Gauss's theorem is applied. In this way, the area regarded as the virtual electrode, that is, an electron density $n_{c,i}$ of the target lattice $l_{a,i,n}$ is calculated. The electron current density continuous equation is expressed by the following formula (25).

$$\frac{\partial}{\partial t}(-qn_{c,i}V_i) + \sum_j J_{n,i,j}A_{i,j} + qGR_iV_i = 0 \quad (25)$$

where, $J_{n,i,j}$ is an electron current density flowing the side $E_{i,j}$ from the lattice point $l_{c,i,n}$ toward the lattice point $l_{c,j,n}$.

<<Step S22>>

The electrostatic potential calculator 22 solves a Poisson's equation using the electron density $n_{c,i}$ obtained in step S21 and the hole density $p_{c,i}$ obtained in step S20. In this way, the electrostatic potential $\Psi_{c,i,n}$ of the lattice point $l_{c,i,n}$ in the area C regarded as the virtual electrode is calculated. The foregoing Poisson's equation is a partial differential equation as well as the electron current density continuous equation. In this case, volume integral of the lattice point $l_{c,i,n}$ is performed using the partial differential equation, and thereafter, Gauss theorem is further applied. This Poisson's equation is omitted here because of being expressed in the same manner as the formula (14) except that an additional character "a" of the electron density and the hole density is changed to "c".

The hole density $p_{c,i}$ of the formula (14) is regarded as a function p $(\Psi_i)$ with $\Psi_i$. Simultaneously, p $(\Psi_i)$ is a function of $\phi_{h,i}$ from the foregoing formulas (21) and (22). Namely, a hole density $p_{a,i}$ is given as a function of $\Psi_i$ and $\phi_{h,i}$. This hole density is the hole density $p_{c,i}$ calculated by the voltage input unit 20 in the foregoing formula (23). Poisson's equation is further expressed by the following formula (26).

$$\sum_j A_{i,j}\left(-\varepsilon_{r,i}\varepsilon_0 \frac{\Psi_j - \Psi_i}{d_{i,j}}\right) - q(p(\Psi_i, \varphi_{h,i}) - n_{a,i} - N_{A,i} + N_{D,i})V_i = 0 \quad (26)$$

Moreover, the foregoing formula (24) is expressed by the following formula (27) using the formulas (21), (8) and (11).

$$p(\Psi_i, \varphi_{h,i}) = \sqrt{N_c N_v} \exp\left(\frac{-E_g + \delta E_c + \delta E_v}{2k_B T}\right) \times$$

$$\exp\left(\frac{E_{Fh,cin}}{k_B T_i} - \frac{1}{k_B T_i}\left(-q\Psi_i - \chi - \frac{E_c - \delta E_c + E_v + \delta E_v}{2} + \frac{k_B T}{2}\ln\left(\frac{N_v}{N_c}\right)\right)\right) \quad (27)$$

A simultaneous equation of the foregoing formulas (26) and (27) is solved. In this way, the electrostatic potential $\Psi_{c,i,n}$ of the lattice point $1_{c,i,n}$ in the area regarded as the virtual electrode, that is, the potential of the floating area FA is calculated.

<<Step S23>>

The current calculator 23 calculates a hole current density $J_h$ flowing out of a unit area of the virtual electrode using the hole density $p_{c,i}$ calculated from the foregoing formulas (26) and (27). The hole current density $J_h$ is expressed by the following formula (28).

$$\vec{J}_h = -q\mu p_{c,i}\nabla\phi_{h,i} \quad (28)$$

where, "$J_h$" is a vector component of electron current density $J_h$, and $\mu$ is an electron mobility. $\phi_{h,i}$ is a hole pseudo-Fermi potential of the lattice point $1_{c,i,n}$, as described above, and thus, easily calculated from the hole density $n_{c,i}$.

In FIG. 6, the floating area is two-dimensionally illustrated; however, an actual simulation is three-dimensionally carried out. For this reason, the foregoing calculation is three-dimensionally carried out with respect to portions regarded as the virtual electrode. Namely, the foregoing calculation is carried out with respect to the inside of the virtual electrode corresponding to an area of z≧0. Specifically, the same analysis as above is made with respect to all lattice points $1_{108}$, $1_{109}$, $1_{112}$ to $1_{114}$ and $1_{117}$ to $1_{119}$ including the lattice point $1_{107}$. The follow proceeds to step S24.

<<Step S24>>

The voltage input unit 20 confirms whether or not the analysis from steps S20 to S23 is made with respect to all lattice points of the area regarded as the virtual electrode. If the analysis is made (YES in step S24), the flow proceeds to step S25. Conversely, if the analysis is not made (NO in step S24), the simulation apparatus 10 repeats the procedures from steps S20 to S23.

<<Step 25>>

The current calculator 23 performs volume or surface integral of the whole of the electrode based on the hole current density $J_h$ calculated from the hole density $p_{c,i}$ of all lattice points $1_i$. In this way, the calculator 23 calculates a terminal current IF flowing out of the electrode. The terminal current IF is expressed by the foregoing formula (18). In this case, if volume or surface integral of a virtual the electrode is performed with respect to the hole current density $J_h$ flowing out of the virtual electrode, the electron current density $J_e$ is replaced with the hole current density $J_h$ in the foregoing formula (19). The foregoing replacement is made, and thereby, the terminal current IF is obtained. The terminal current IF is expressed by the following formula (29).

$$IF = \int_{\partial\Omega} \vec{J}_h \cdot d\vec{s} = \int_\Omega div\vec{J}_h dv \quad (29)$$

<<Step S16>>

The procedure of step S16 described in CASE I is performed. Specifically, the judgment unit 24 executes the control so that the terminal current IF is set to zero. In this way, a hole density $p_{a,i}$ and an electrostatic potential $\Psi_{c,i,n}$, that is, the potential of the floating area FA is confirmed.

<CASE III>

Figure 11:
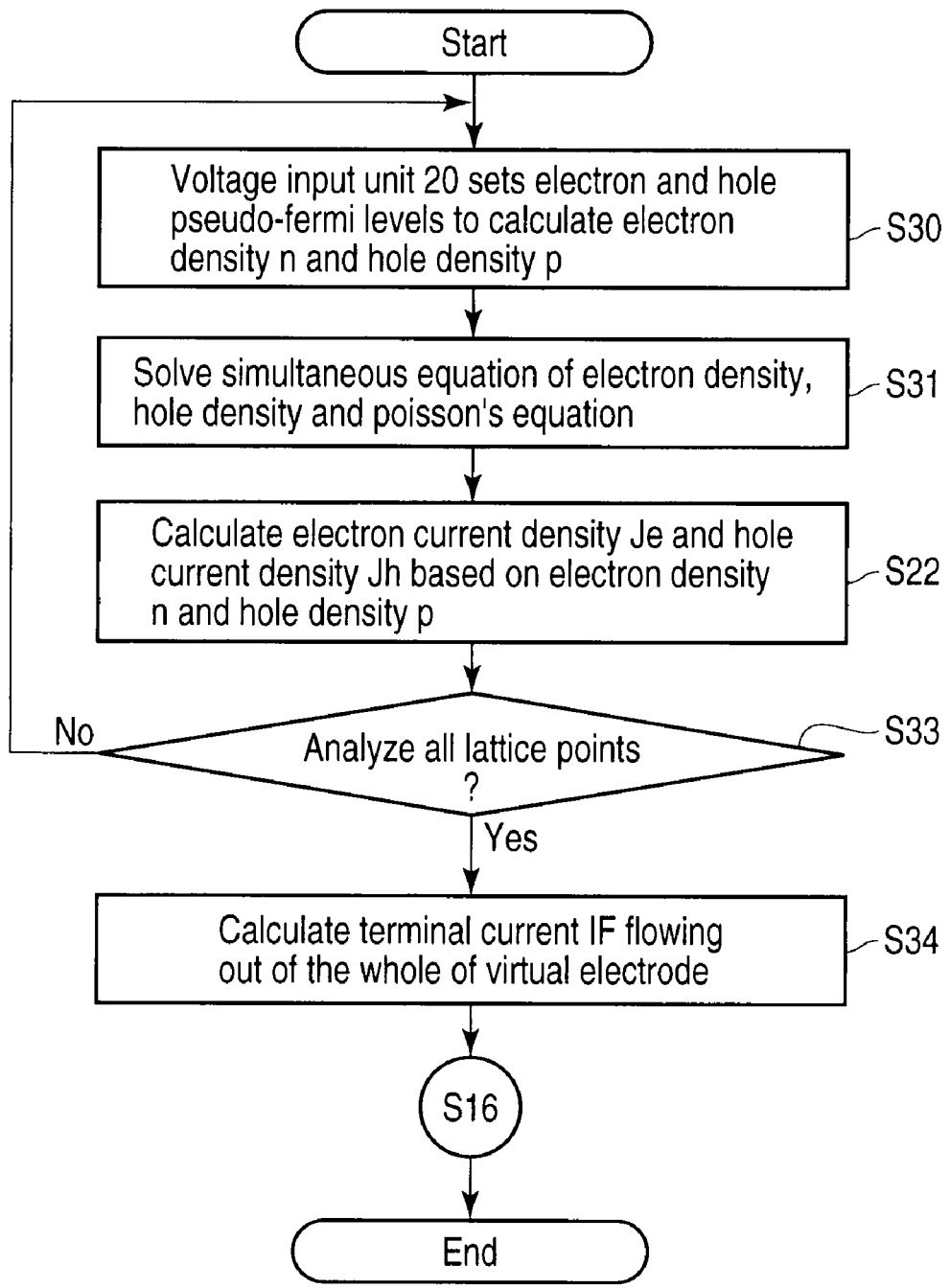
FIG. 11 is a flowchart to explain a simulation method according to a first embodiment.

CASE III will be described below with reference to FIG. 11. FIG. 11 shows the details of step S5 in CASE III.

<<Step S30>>

The voltage input unit 20 applies a voltage to a virtual electrode. Namely, electron and hole pseudo-Fermi levels are each set in the lattice point $1_i$ regarded as a virtual electrode. In this way, an electron density $n_i$ and a hole density $p_i$ of an n-type semiconductor area are each set. This procedure will be described below.

For example, it is assumed that the virtual electrode of FIG. 6 described in CASE I. FIG. 12 shows an energy band view in the interface between a virtual electrode and a floating area FA. FIG. 12 shows a state of the lattice point $1_{107}$. The lattice point $1_i$ arranged in a range of z≧0 is assumed as the side of a virtual electrode (shown by an area E in FIG. 12). For example, the lattice point $1_{107}$ of the interface (z=0) is given as a lattice point $1_{e,107,i}$, and lattice points $1_{e,107,2}$, $1_{e,107,3}$ ··· $1_{e,107,n}$, are arranged toward the z≧0 direction, that is, from the surface of an area regarded as a virtual electrode to the inside.

The voltage input unit 20 applies a voltage to all lattice points $1_{e,107,1}$ to $1_{e,107,n}$ corresponding to the lattice point $1_{107}$, and thereby, sets an electron density n and a hole density p corresponding to each of the lattice points $1_{e,107,1}$ to $1_{e,107,n}$. The same procedure as above is performed with respect to other lattice point $1_i$.

In CASE III, the voltage input unit 20 controls the magnitude of a voltage applied to a virtual electrode, and thereby, sets each of hole and electron pseudo-Fermi levels of a lattice point $1_{e,i,n}$ of an area regarded as a virtual electrode. Namely, the foregoing formulas (2) and (20) described in CASES I and II are used. Specifically, in CASE III, an electron pseudo-Fermi level $E_{Fe,i}$ and a hole pseudo-Fermi level $E_{Fh,i}$ are obtained from the foregoing formulas (3) and (21), respectively. An electron density $n_{e,i}$ and a hole density $p_{e,i}$ are obtained from the foregoing formulas (12) and (24). The flow proceeds to step S31.

<<Step S31>>

The electrostatic potential calculator 22 solve a Poisson's equation using the electron density $n_{e,i}$ and the hole density $p_{e,i}$ obtained in step S30. In this way, electron density, hole density and electrostatic potential $\Psi_{e,i,n}$ of the area E functioning as the virtual electrode are each calculated. The Poisson's equation is omitted here because it is expressed in the same manner as the formula (14) shown in CASES and I and II except that an additional character "a" or "c" of electron density and hole density is changed to "e".

Electron density $n_{e,i}$ and hole density $p_{e,i}$ in the formula (14) are regarded as functions n ($\Psi_i$) and p ($\Psi_i$) with $\Psi_i$, respectively. Namely, the Poisson's equation shown in the formula (14) is expressed by the following formula (30) like CASES I and II.

$$\sum_j A_{i,j}\left(-\varepsilon_{r,i}\varepsilon_0 \frac{\Psi_j - \Psi_i}{d_{i,j}}\right) - q(p(\Psi_i, \varphi_{h,i}) - \quad (30)$$

$$n(\Psi_i, \varphi_{e,i}) - N_{A,i} + N_{D,i})V_i = 0$$

A simultaneous equation of the foregoing formulas (16), (27) and (30) is solved.

In this way, the electrostatic potential $\Psi_{e,i,n}$ of the lattice point $1_{e,i,n}$ in the area functioning as the virtual electrode, that is, the potential of the floating area FA is calculated.

<<Step S32>>

The current calculator 23 calculates an electron current density $J_e$ and a hole current density $J_h$ flowing out of a virtual electrode using electron density $n_{c,i}$ and hole density $p_{c,i}$ calculated from the foregoing formulas (16), (27) and (30).

The foregoing electron current density $J_e$ and hole current density $J_h$ are expressed by formulas (17) and (28) described in CASES I and II. The flow proceeds to step S34.

<<Step S34>>

The current calculator 23 confirms whether or not analysis from steps S30 to S33 is performed with respect to all lattice points $1_i$ of the virtual electrode. If the analysis is performed (YES in step S34), the current calculator 23 calculates volume or surface integral of the whole of electrode based on electron current density $J_e$ and hole current density $J_h$ calculated from electron density $n_i$ and hole density $p_i$ of all lattice points $1_i$. In this way, a terminal current IF flowing out of the virtual electrode is calculated.

Namely, the terminal current IF is calculated using the foregoing formulas (17) and (28). Therefore, the terminal current IF flowing out of the virtual electrode is expressed by the following formula (31).

$$IF = \int_{\partial\Omega} (\vec{J}_e + \vec{J}_h) \cdot d\vec{s} = \int_\Omega div(\vec{J}_e + \vec{J}_h)dv \quad (31)$$

<<Step S16>>

The judgment unit 24 can confirm accurate electron density n, hole density p and electrostatic potential $\Psi_{e,i,n}$, that is, the potential of the floating area FA. This is because the current calculator 23 executes the control so that the terminal current IF flowing out of the virtual electrode is set to zero, as described above.

The simulation apparatus can improve analysis accuracy of electrical characteristics of the floating area FA. This effect will be explained below.

For example, FIG. 13 is a graph showing a electron density n and a donor ion density $N_D$ of the floating area FA shown in FIG. 4 with respect to the position along the X-axis direction.

FIG. 14 is a graph observed when an ohmic electrode is contacted with the foregoing floating area FA. When the ohmic electrode is contacted with the floating area FA, the simulation apparatus judges that a neutral condition, that is, $n=N_D$ is established between electron density n and donor ion density $N_D$ in the interface between the area FA and the electrode. As a result, judgment is made in error such that a semiconductor area satisfies $n=N_D$ ("n'" is shown in FIG. 14) between X=X2 to X3 having ohmic contact with the virtual electrode.

FIG. 15 is a graph observed when a Schottky electrode is contacted with the foregoing floating area FA. When the Schottky electrode is contacted with the floating area FA, as can be seen from FIG. 15, it is judged that the semiconductor area is less than the actual distribution.

In contrast to this, according to the configuration of this embodiment, a virtual electrode functioning as a non-neutral charge electrode is used. Namely, when electrical characteristics of the lattice point $1_i$ of the area regarded as a virtual electrode are calculated, the electrical characteristics are calculated using the same calculation method as the semiconductor area.

Specifically, in CASE I, the electron density n set by the initial voltage given to the lattice point $1_i$ by the voltage input unit 20 is used. Electron density and hole density are calculated without contradiction by a simultaneous equation of a hole current density continuous equation and a Poisson's equation including the set electron density n. This is because the electron density n of the floating area FA is expressed by a function n ($\Psi$) of electrostatic potential $\Psi$. However, the voltage applied to the lattice point $1_i$ as the initial voltage by the voltage input unit 20 is artificially given externally. Namely, calculated electron density n and electrostatic potential $\Psi$ is a physical amount of the floating area FA at the current time or is not so. For this reason, the judgment unit 24 confirms a terminal current IF flowing through the virtual electrode calculated by the current calculator 23 based on the foregoing electron density n. Then, the judgment unit 24 controls the voltage applied to the lattice point $1_i$ by the voltage input unit 20 so that the terminal current IF is set to zero. In this way, the voltage input unit 20 can make the correspondence of a pseudo-Fermi level of the electron density n of the lattice point $1_i$ in the virtual electrode with a pseudo-Fermi level of the electron density n of the lattice point $1_i$ in the floating area FA. Namely, the foregoing simultaneous equation is solved using the electron density n corrected by the judgment unit 24. In this way, it is possible to correctly grasp the distribution shown in FIG. 13, and to improve analysis accuracy.

In CASE II, the hole density p set by the initial voltage given to the lattice point $1_i$ by the voltage input unit 20 is used like the foregoing CASE I. Electron density and hole density are calculated without contradiction by a simultaneous equation of a hole current density continuous equation and a Poisson's equation including the set hole density p. This is because the hole density p of the floating area FA is expressed by a function n ($\Psi$) of electrostatic potential $\Psi$. However, the voltage applied to the lattice point $1_i$ as the hole density p is artificially given. Namely, calculated hole density p and electrostatic potential $\Psi$ is a physical amount of the floating area FA at the current time or is not so. For this reason, the judgment unit 24 confirms a terminal current IF flowing through the virtual electrode calculated by the current calculator 23 based on the foregoing hole density p in the same manner as above. Then, the voltage input unit 20 controls the voltage applied to the lattice point $1_i$ so that the terminal current IF is set to zero. In this way, the voltage input unit 20 can make the correspondence of a pseudo-Fermi level of the hole density p of the lattice point $1_i$ in the virtual electrode with a pseudo-Fermi level of the hole density p of the lattice point $1_i$ in the floating area FA. Namely, the foregoing simultaneous equation is gain solved using the electron density n corrected by the judgment unit 24. In this way, it is possible to analyze the floating area FA with high accuracy.

In CASE III, a simultaneous equation of a hole density p and a Poisson's equation including the hole density p set by the voltage given by the voltage input unit 20 is solved like the foregoing CASES I and II. Then, the judgment unit 24 confirms a terminal current IF, and controls the voltages so that the terminal current IF is set to zero. In this way, the voltage input unit 20 can make the correspondence of a pseudo-Fermi level of the hole density p and the electron density of the lattice point $l_i$ in the virtual electrode with a pseudo-Fermi level of the hole density p and the electron density n in the floating area FA. Namely, the foregoing simultaneous equation is gain solved using the hole density p and the electron density n corrected by the judgment unit 24. In this way, it is possible to analyze the floating area FA with high accuracy.

Second Embodiment

A simulation apparatus for a semiconductor device and an analysis system according to a second embodiment of the invention will be hereinafter described. This second embodiment relates to the case where the simulation method according to the first embodiment is applied to an actual semiconductor device. The configuration of the simulation apparatus according to this embodiment is the same as the foregoing first embodiment; therefore, the explanation is omitted.

A semiconductor device shown in FIG. 16 is given as an example. Specifically, the semiconductor device has the structure in which a metal piece 54 surrounded by an insulator 52 and applied with an external voltage is formed on a p-type semiconductor area 51 contacting with an electrode 50. For example, a MOS transistor is given as the semiconductor device having the foregoing structure.

As shown in FIG. 16, a fixed voltage is applied to the metal piece 54 (e.g., a gate electrode of a MOS transistor) so that the surface of the p-type semiconductor area 51 is formed with an n-type inversion layer 55. The lower portion of the n-type inversion layer 55 generated on the p-type semiconductor area 51 is surrounded by a depletion layer 56, and the upper portion thereof contacts with the insulator 52 at the interface. In other words, the target inversion layer 55 does not contact with a metal having conductivity. For this reason, the inversion layer 55 is regarded as a floating area FA. In this case, the inversion layer 55 may be generated under a voltage [V] condition without applying a voltage to the metal piece 54.

Figure 17:
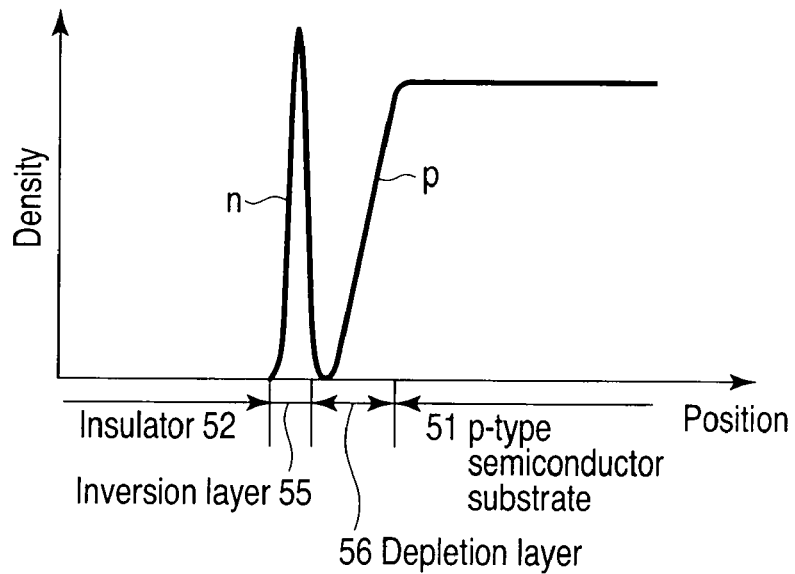
FIG. 17 is a graph showing the simulation result according to a second embodiment.

Even if the foregoing semiconductor device is provided, the simulation method described in the first embodiment is applicable. FIG. 17 is a graph showing a carrier density along the depth direction from the surface of a semiconductor substrate.

Figure 18:
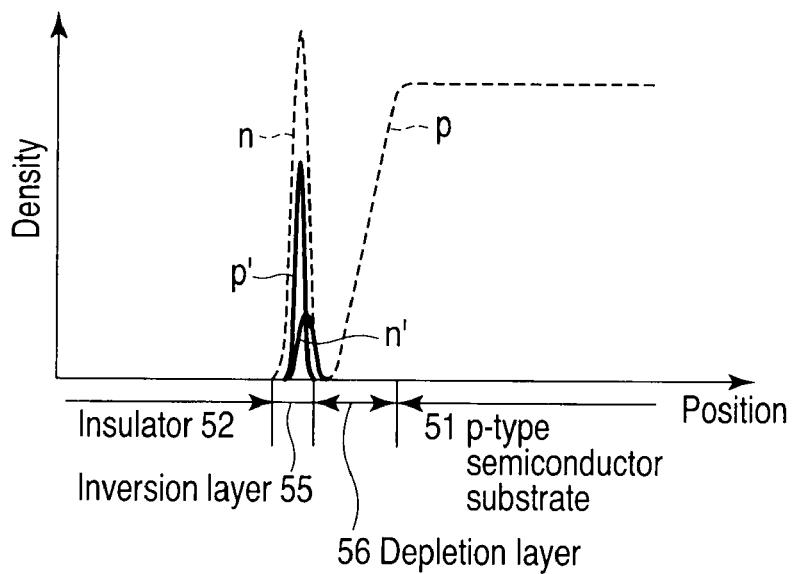
FIGS. 18 and 19 are graphs showing the simulation result.
Figure 19:
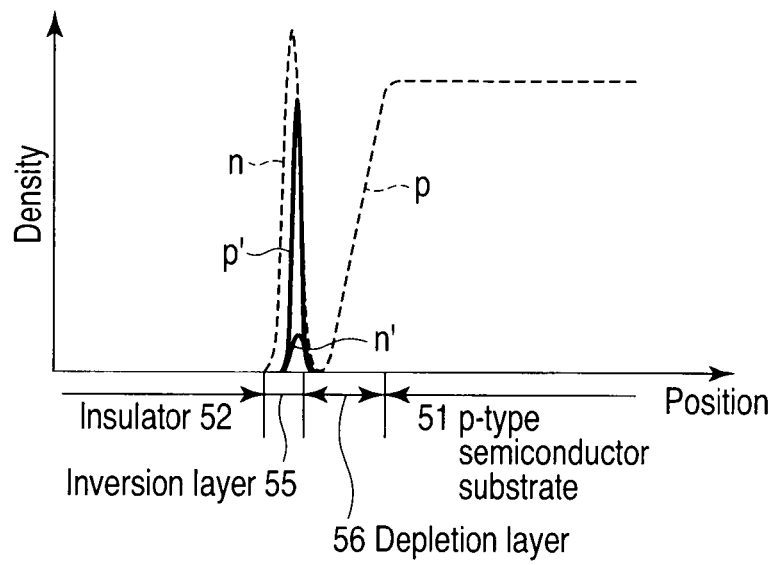

FIG. 18 is a graph observed when an ohmic electrode is contacted with the foregoing floating area FA. When the ohmic electrode is contacted with the floating area FA, a hole density is higher than an electron density; for this reason, it is judged in error that the inversion layer is a p-type inversion layer. FIG. 19 is a graph observed when a Schottky electrode is contacted with the floating area. Likewise, when the Schottky electrode is contacted with the floating area, it is judged in error that the inversion layer is a p-type inversion layer. However, the simulation apparatus can correctly grasp the distribution shown in FIG. 17 using the method described in the first embodiment. Even if the floating area FA is in a thermal non-equilibration, it is possible to analyze electrical characteristics of the floating area FA.

Third Embodiment

A simulation apparatus for a semiconductor device and an analysis system according to a third embodiment of the invention will be hereinafter described. According to the third embodiment, the simulation method described in the foregoing first embodiment is carried out using software.

Figure 20:
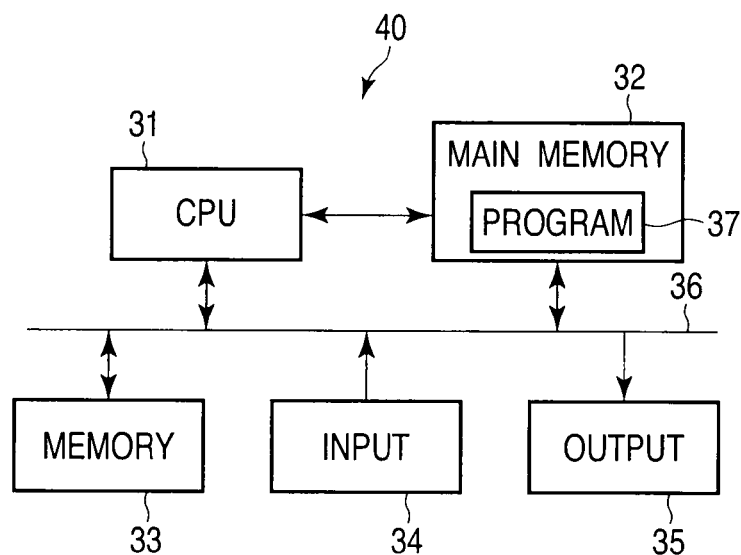
FIG. 20 is a block diagram showing the configuration of a simulation apparatus according to a third embodiment.

FIG. 20 is a block diagram showing the configuration of a simulation apparatus according to the third embodiment. As can be seen from FIG. 20, the simulation apparatus is a computer 40, which includes a CPU 31, a main memory 32, a memory 33, an input device 34, an output device 35 and a data bus 36. The memory 33 includes an analysis program 37.

The analysis program 37 includes procedures described in FIGS. 3, 5, 9 and 11 of the foregoing first embodiment with respect to the CPU 31.

The CPU 31 reads the analysis program 37 from the memory 33 to the main memory 32 in a simulation operation. Then, the CPU 31 executes procedures of FIGS. 3, 5, 9 and 11 according to the analysis program held in the main memory 32. In other words, the CPU 31 functions as the area judgment unit 11, the area determination unit 12 and the calculator 13 described in FIG. 2 of the first embodiment.

As described above, the simulation method according to the first embodiment is executable using software, and not hardware.

Fourth Embodiment

A simulation apparatus for a semiconductor device and an analysis system according to a fourth embodiment of the invention will be hereinafter described. The foregoing first to third embodiments relates to the case of calculating electron density, hole density and electrostatic potential of the area regarded as a virtual electrode. According to this fourth embodiment, other equations are further used, and thereby, other electrical characteristics are calculated in addition to the foregoing characteristics.

<Case of Calculating a Charge>

The case of calculating a charge Q [C] of a floating area FA will be described below with reference to FIGS. 4 and 5. The configuration of a simulation apparatus according to this embodiment is the same as the foregoing first or third embodiment; therefore, the explanation is omitted.

As depicted in FIG. 4, a plurality of lattice points $l_i$ are arranged in a floating area FA. When a charge of the floating area FA is set as QF, the QF is expressed as a charge $Q_i$ in the control volume CV corresponding to the lattice point $l_i$ arranged in the floating area FA. The charge QF is expressed by the following formula (32).

$$QF = \sum_i Q_i \tag{32}$$

Further, Qi is expressed by the following formula (33).
[Mathematical Formula 29]

$$Q_i = q(p_i - n_i - N_{A,i} + N_{D,i})V_i \tag{33}$$

where, $V_i$ is a volume of the control volume CV corresponding to the lattice point $l_i$.

Specifically, as shown in FIG. 5, when lattice points $l_{107}$ to $l_{109}$, $l_{112}$ to $l_{114}$ and $l_{117}$ to $l_{119}$ are arranged in the floating area FA, the charge QF of the floating area FA is expressed by the following formula (34).

$$QF = Q_{107} + Q_{108} + Q_{109} + Q_{112} + Q_{113} + Q_{114} + Q_{117} + Q_{118} + Q_{119} \tag{34}$$

According to this embodiment, an equation for analyzing the charge QF stored in the floating area FA shown in the foregoing formula (34) is added to DDM described in the first embodiment. Namely, a simultaneous equation of the foregoing DDM and the equation for analyzing the charge QF is solved. In this case, when the equation for analyzing the charge QF is added, one unknown number must be added in order to solve the foregoing equation. Thus, an application voltage Vappl to a virtual electrode is given as an unknown number to analyze the foregoing equation. An equation for analyzing the charge QF is expressed by the following formula (35).

$$QF=QF(V_{appl}) \quad (35)$$

As shown in the foregoing formula (35), the charge QF is set as a function of application voltage Vappl. Namely, the application voltage Vappl is given to a virtual electrode. In this case, the application voltage Vappl is controlled so that a terminal current IF flowing through the virtual electrode is set to 0 ampere [A]. As described above, alternate small signal analysis is made with respect to the floating area FA, and thereby, it is possible to analyze the capacity of the floating area FA. In this way, the charge QF of the floating area FA is analyzed using the application voltage Vappl when the terminal current IF flowing through the virtual electrode becomes 0 ampere [A] and the capacity of the floating area FA calculated from the foregoing alternate small signal analysis.

The judgment unit 24 described in the foregoing first embodiment may calculate the charge QF (Vappl). In this case, applies the foregoing application voltage Vappl to the virtual electrode, and thereafter, calculates the charge QF. Moreover, the judgment unit 24 may be provided with a new analysis unit, which applies an application voltage Vappl, and analyzes the foregoing charge QF.

The CPU 31 described in the foregoing third embodiment may analyze the charge QF of the floating area FA. In this case, the CPU 31 executes a program for applying the application voltage Vappl, and analyzing a charge of the floating area FA from the capacity of the floating area.

As described above, the charge QF (Vappl) obtained from the application voltage Vappl and the capacity of the floating area FA is analyzed by the equation of the formula (35) based on the formula (33). Therefore, an accurate charge QF (Vappl) can be calculated.

<Case of Calculating Absolute Temperature>

For example, a thermal conduction equation may be included in the foregoing DDM. Namely, a simultaneous equation of the foregoing DDM and the thermal conduction equation is solved. In this way, the absolute temperature $T_i$ of each lattice point $l_i$ is calculated. In order to calculate the absolute temperature $T_i$, volume integral of the control volume CV area corresponding to the lattice point $l_i$ is performed like a current density continuous equation and a Poisson's equation, and thereafter, Gauss theorem is applied. The thermal conduction equation for calculating the absolute temperature $T_i$ is expressed y the following formula (36).

$$\frac{\partial}{\partial t}(\rho_i c_i T_i V_i) - H_i V_i - \sum_j \left(k_i \frac{T_j - T_i}{d_{i,j}}\right) = 0 \quad (36)$$

where, $T_i$ is an absolute temperature of the lattice point $l_i$, $T_j$ is an absolute temperature of the lattice point $l_j$, $\rho_i$ is a substance (floating area FA) density, $c_i$ is a substance (floating area FA) specific heat capacity, $H_i$ is a heat quantity of the lattice point $l_i$ generated per unit volume and unit time, and $k_i$ is a thermal conductivity of the lattice point $l_i$.

Namely, the foregoing formula (36) is calculated as an unknown number of the floating area FA, and thereby, temperature distribution of the floating area is obtained when a semiconductor device operates.

In order to calculate the absolute temperature Ti of the lattice point $l_i$, any functional unit (e.g., judgment unit 24) of the calculator 13 described in the first embodiment analyzes the foregoing formula (36). Moreover, the calculator 13 may be provided with a new analysis unit, which analyzes the foregoing formula (36).

As described above, according to the first to fourth embodiments of the invention, a part of the floating area FA is regarded as a virtual electrode functioning as a non-neutral charge electrode, and the virtual electrode is regarded as a semiconductor to calculate electrical characteristics. Therefore, accurate electrical characteristics are obtained.

In addition, as described in the foregoing fourth embodiment, a new equation is added to DDM, and thereby, it is possible to obtain new electrical characteristics in which an unknown number of the floating area FA is given.

In the foregoing simulation apparatus, the position of the virtual electrode to be given is not necessarily limited to the floating area FA, but may be an area where a depletion layer is generated. Specifically, the electrical characteristic of the floating area FA changes and a depletion layer surrounding the floating area is expanded. However, even if a portion given as the floating area FA so far is formed as a depletion layer, it is possible to analyze the electrical characteristic of the floating area FA. Namely, in the area regarded as the virtual electrode, for example, if at least one analysis is made with respect to the lattice point $l_i$ shown in FIGS. 4 and 6, the electrical characteristic of the floating area FA is obtained. In this case, a floating analysis method by the virtual electrode is the same as described above.

The device simulation method of a semiconductor device according to this embodiment includes the following steps (S10) to (S16):

a step (S10) of applying an external voltage to a virtual electrode, and setting an electron pseudo-Fermi level of a lattice point of an area functioning as the virtual electrode in the semiconductor device;

a step (S11) of analyzing a hole current density continuous equation with respect to a hole density of the lattice point;

a step (S12) of regarding an electron density as a function of an electrostatic potential of the lattice point, and solving a simultaneous equation of the function and a Poisson's equation substituting the hole density, and thereby, calculating the electrostatic potential of the lattice point and the electron density expressed by the function;

a step (S13) of calculating an electron current density flowing out of the virtual electrode using the electron density expressed by the function;

a step (S14) of confirming whether or not the procedures of the foregoing steps (S10) to (S13) are preformed with respect to all lattice points of the area functioning as a virtual electrode;

a step (S15) of analyzing a terminal current flowing out of the virtual electrode based on the electron current density; and a step (S16) of controlling the external voltage applied to the virtual electrode based on the terminal current.

Further, the device simulation method of a semiconductor device according to this embodiment includes the following steps (S20) to (S25) and (S16):

a step (S20) of applying an external voltage to a virtual electrode, and setting a hole pseudo-Fermi level of a lattice point of an area functioning as the virtual electrode in the semiconductor device;

a step (S21) of analyzing an electron current density continuous equation with respect to an electron density of the lattice point;

a step (S22) of regarding a hole density as a function of an electrostatic potential of the lattice point, and solving a simultaneous equation of the function and a Poisson's equation substituting the electron density, and thereby, calculating the electrostatic potential of the lattice point and the hole density expressed by the function;

a step (S23) of calculating a hole current density flowing out of the virtual electrode using the hole density expressed by the function;

a step (S24) of confirming whether or not the procedures of the foregoing steps (S20) to (S23) are preformed with respect to all lattice points of the area functioning as a virtual electrode;

a step (S25) of analyzing a terminal current flowing out of the virtual electrode based on the hole current density; and a step (S16) of controlling the external voltage applied to the virtual electrode based on the terminal current.

Furthermore, the device simulation method of a semiconductor device according to this embodiment includes the following steps (S30) to (S34) and (S16):

a step (S30) of applying an external voltage to a virtual electrode, and setting electron and hole pseudo-Fermi levels of a lattice point of an area functioning as the virtual electrode in the semiconductor device, and thereby, calculating electron and hole density of the lattice point;

a step (S31) of regarding the foregoing electron and hole density as a function of an electrostatic potential of the lattice point, and solving a simultaneous equation of the function and a Poisson's equation substituting the electron density, and thereby, calculating the electrostatic potential of the lattice point and the electron density and the hole density expressed by the function;

a step (S32) of calculating an electron current density and a hole current density flowing out of the virtual electrode using the electron density and the hole density expressed by the function;

a step (S33) of confirming whether or not the procedures of the foregoing steps (S30) to (S32) are preformed with respect to all lattice points of the area functioning as a virtual electrode;

a step (S34) of analyzing a terminal current flowing out of the virtual electrode based on the electron current density and the hole current density; and a step (S16) of controlling the external voltage applied to the virtual electrode based on the terminal current.

Furthermore, the device simulation method of a semiconductor device according to this embodiment includes the following steps:

a step of searching the surroundings of the semiconductor area, which does not electrically contact with any current path, using the presence of a carrier density distribution of the semiconductor area; and a step of determining an area functioning as the virtual electrode in the searched semiconductor area.

A simulation apparatus for a semiconductor device further includes the foregoing steps. The simulation apparatus for a semiconductor device controls a voltage applied to the virtual electrode based on a current flowing through the virtual electrode, and thereby, makes the correspondence of pseudo-Fermi levels of the semiconductor area and the virtual electrode.

Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A simulation apparatus of a semiconductor device comprising:

a first calculator calculating a voltage to be applied to an area which is a part of a semiconductor area having no electric contact with a current path and functions as a virtual electrode, and setting a pseudo-Fermi level of a first conduction type carrier of a lattice point in the area which is part of the semiconductor area having no electric contact with a current path and functions as a virtual electrode, to calculate a first conduction type carrier density of the lattice point;

a second calculator analyzing a current density continuous equation of a second conduction type carrier, having a density smaller than the first conduction type carrier in the lattice point, to calculate a second conduction type carrier density;

a third calculator using the first conduction type carrier density calculated by the first calculator as a function of an electrostatic potential of the lattice point, and solving (1) a first simultaneous equation including the function and (2) a Poisson's equation substituting the second conduction type carrier density calculated by the second calculator to calculate an electrostatic potential of the lattice point and the first conduction type carrier density expressed by the function;

a fourth calculator calculating a current density of the first conduction type carrier based on the first conduction type carrier density calculated by the third calculator to calculate a current flowing out of the whole of the virtual electrode; and a controller controlling the voltage applied to the virtual electrode as calculated by the first calculator based on the current calculated by the fourth calculator.

2. The apparatus according to claim 1, wherein the first conduction type carrier is an electron, and the second calculator analyzes the current density continuous equation to calculate a density of holes, which are the second conduction type carrier.

3. The apparatus according to claim 1, further comprising:

an area judgment unit searching the semiconductor area using the presence of distribution of the carrier density of the semiconductor area; and a determination unit designating a place to which the virtual electrode is given in the semiconductor area found by the area judgment unit, wherein the controller controls the voltage applied to the virtual electrode so that the current flowing out of the virtual electrode becomes zero.

4. The apparatus according to claim 1, wherein the third calculator adds an equation for a measurement target electrical characteristic to the first simultaneous equation to calculate the measurement target electrical characteristic.

5. The apparatus according to claim 1, wherein when a charge of the lattice point is calculated as a measurement target electrical characteristic, the fourth calculator calculates a charge of the lattice point using the first conduction type carrier density of the lattice point and the second conduction type carrier density of the lattice point obtained from the first conduction type carrier density, and the third calculator regards the charge of the lattice point calculated by the fourth calculator as a function of the voltage controlled by the controller, and analyzes a second simultaneous equation of the function and the first simultaneous equation, and further, calculates the charge using the voltage of the lattice point.

6. The apparatus according to claim 1, wherein when an absolute temperature of the lattice point is calculated as a measurement target electrical characteristic, the third calculator solves a third simultaneous equation of a thermal conduction equation in which an absolute temperature of the lattice point is set as an unknown quantity and the first simultaneous equation, to calculate the absolute temperature of the lattice point.

7. The apparatus according to claim 3, wherein the controller reduces the current passing through the virtual electrode to zero.

8. The apparatus according to claim 1, wherein the first conduction type carrier is a hole, and the second calculator analyzes the current density continuous equation to calculate a density of electrons, which are the second conduction type carrier.

9. The apparatus according to claim 8, further comprising:
an area judgment unit searching the semiconductor area using the presence of distribution of the carrier density of the semiconductor area; and
a determination unit designating a place to which the virtual electrode is given in the semiconductor area found by the area judgment unit, wherein
the controller controls the voltage applied to the virtual electrode so that the current flowing out of the virtual electrode becomes zero.

10. The apparatus according to claim 8, wherein the third calculator adds an equation for a measurement target electrical characteristic to the first simultaneous equation to calculate the measurement target electrical characteristic.

11. The apparatus according to claim 8, wherein when a charge of the lattice point is calculated as a measurement target electrical characteristic, the fourth calculator calculates a charge of the lattice point using a hole density of the lattice point and an electron density of the lattice point obtained from the hole density, and
the third calculator regards the charge of the lattice point calculated by the fourth calculator as a function of the voltage controlled by the controller, and analyzes a second simultaneous equation of the function and the first simultaneous equation, and further, calculates the charge using the voltage of the lattice point.

12. The apparatus according to claim 8, wherein when an absolute temperature of the lattice point is calculated as a measurement target electrical characteristic, the third calculator solves a third simultaneous equation of a thermal conduction equation in which an absolute temperature of the lattice point is set as an unknown quantity and the first simultaneous equation, to calculate the absolute temperature of the lattice point.

13. The apparatus according to claim 9, wherein the controller reduces the current passing through the virtual electrode to zero.

14. A simulation apparatus of a semiconductor memory device comprising:
a first calculator calculating a voltage to be applied to an area which is a part of a semiconductor area having no electric contact with a current path and functions as a virtual electrode, and setting electron and hole pseudo-Fermi levels of a lattice point in the area which is part of the semiconductor area having no electric contact with a current path and functions as a virtual electrode, functioning to calculate an electron density and a hole density of the lattice point;
a second calculator regarding the electron density and the hole density calculated by the first calculator as a function of an electrostatic potential of the lattice point, and solving (1) a first simultaneous equation including the function and (2) a Poisson's equation to calculate an electrostatic potential of the lattice point, the electron density and the hole density expressed by the function;
a third calculator calculating an electron current density and a hole current density based on the electron density and the hole density calculated by the second calculator to calculate a current flowing out of the whole of the virtual electrode; and
a controller controlling the voltage applied to the virtual electrode as calculated by the first calculator based on the current calculated by the third calculator.

15. The apparatus according to claim 14, further comprising:
an area judgment unit searching the semiconductor area using the presence of distribution of the carrier density of the semiconductor area; and
a determination unit designating a place to which the virtual electrode is given in the semiconductor area found by the area judgment unit, wherein
the controller controls the voltage applied to the virtual electrode so that the current flowing out of the virtual electrode becomes zero.

16. The apparatus according to claim 15, wherein the controller reduces the current passing through the virtual electrode to zero.

17. The apparatus according to claim 14, wherein the second calculator adds an equation for a measurement target electrical characteristic to the first simultaneous equation to calculate the measurement target electrical characteristic.

18. The apparatus according to claim 14, wherein when a charge of the lattice point is calculated as a measurement target electrical characteristic, the third calculator calculates a charge of the lattice point using the electron density and the hole density of the lattice point, and
the second calculator regards the charge of the lattice point calculated by the third calculator as a function of the voltage controlled by the controller, and analyzes a second simultaneous equation of the function and the first simultaneous equation, and further, calculates the charge using the voltage of the lattice point.

19. The apparatus according to claim 14, wherein when an absolute temperature of the lattice point is calculated as a measurement target electrical characteristic, the second calculator solves a third simultaneous equation of a thermal conduction equation in which an absolute temperature of the lattice point is set as an unknown quantity and the first simultaneous equation, to calculate the absolute temperature of the lattice point.

* * * * *